US010818967B2

(12) United States Patent
Kaga et al.

(10) Patent No.: US 10,818,967 B2
(45) Date of Patent: Oct. 27, 2020

(54) SOLID ELECTROLYTE COMPOSITION, ELECTRODE SHEET FOR ALL-SOLID STATE SECONDARY BATTERY, ALL-SOLID STATE SECONDARY BATTERY, AND METHODS FOR MANUFACTURING ELECTRODE SHEET FOR ALL-SOLID STATE SECONDARY BATTERY AND ALL-SOLID STATE SECONDARY BATTERY

(71) Applicant: FUJIFILM Corporation, Tokyo (JP)

(72) Inventors: Hiroshi Kaga, Kanagawa (JP); Hiroaki Mochizuki, Kanagawa (JP); Tomonori Mimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 15 days.

(21) Appl. No.: 16/019,963

(22) Filed: Jun. 27, 2018

(65) Prior Publication Data

US 2018/0309167 A1 Oct. 25, 2018

Related U.S. Application Data

(63) Continuation of application No. PCT/JP2017/004029, filed on Feb. 3, 2017.

(30) Foreign Application Priority Data

Feb. 19, 2016 (JP) ................................ 2016-030490

(51) Int. Cl.
*H01M 10/0562* (2010.01)
*H01M 4/139* (2010.01)
(Continued)

(52) U.S. Cl.
CPC ....... *H01M 10/0562* (2013.01); *H01M 4/139* (2013.01); *H01M 4/1393* (2013.01);
(Continued)

(58) Field of Classification Search
CPC ..................... H01M 10/0562; H01M 10/0564
See application file for complete search history.

(56) References Cited

U.S. PATENT DOCUMENTS

2006/0127772 A1 6/2006 Ota et al.
2012/0034529 A1 2/2012 Tatsumisago et al.
(Continued)

FOREIGN PATENT DOCUMENTS

CN 1739211 A 2/2006
CN 102334225 A 1/2012
(Continued)

OTHER PUBLICATIONS

Machine Translation of JP2013157084A (Jan. 2020) (Year: 2020).*
(Continued)

*Primary Examiner* — Matthew J Merkling
(74) *Attorney, Agent, or Firm* — Sughrue Mion, PLLC

(57) ABSTRACT

Provided are a solid electrolyte composition including an active material, a first sulfide-based inorganic solid electrolyte, and a second sulfide-based inorganic solid electrolyte having a composition different from that of the first sulfide-based inorganic solid electrolyte, in which the first sulfide-based inorganic solid electrolyte contains a halogen element and has a crystal phase at least in part, and the active material and the first sulfide-based inorganic solid electrolyte are in contact with each other, an electrode sheet for an all-solid state secondary battery and an all-solid state secondary battery for which the solid electrolyte composition is used, and methods for manufacturing an electrode sheet for an all-solid state secondary battery and an all-solid state secondary battery.

12 Claims, 1 Drawing Sheet

(51) Int. Cl.

| | |
|---|---|
| ***H01M 4/62*** | (2006.01) |
| ***H01M 4/1393*** | (2010.01) |
| ***H01M 4/583*** | (2010.01) |
| ***H01M 4/66*** | (2006.01) |
| ***H01M 10/0525*** | (2010.01) |
| ***H01M 4/02*** | (2006.01) |

(52) U.S. Cl.

CPC ........... *H01M 4/583* (2013.01); *H01M 4/623* (2013.01); *H01M 4/624* (2013.01); *H01M 4/661* (2013.01); *H01M 10/0525* (2013.01); *H01M 2004/027* (2013.01); *H01M 2004/028* (2013.01); *H01M 2300/0068* (2013.01)

(56) References Cited

U.S. PATENT DOCUMENTS

| | | | | |
|---|---|---|---|---|
| 2014/0127579 | A1 | 5/2014 | Yoshida et al. | |
| 2014/0199598 | A1 | 7/2014 | Hoshina et al. | |
| 2015/0134172 | A1 | 5/2015 | Ose et al. | |
| 2015/0147659 | A1 | 5/2015 | Kato | |
| 2015/0162614 | A1* | 6/2015 | Koshika | H01M 4/13 429/189 |
| 2015/0270571 | A1* | 9/2015 | Kambara | C03C 3/321 429/319 |
| 2016/0028107 | A1 | 1/2016 | Kubo et al. | |
| 2018/0016185 | A1* | 1/2018 | Nakata | C03C 3/321 |
| 2018/0162730 | A1* | 6/2018 | Senga | C01B 17/16 |

FOREIGN PATENT DOCUMENTS

| | | | |
|---|---|---|---|
| CN | 104638310 | A | 5/2015 |
| EP | 2 869 371 | A1 | 5/2015 |
| JP | 2008-103203 | A | 5/2008 |
| JP | 201 1-1 87370 | A | 9/2011 |
| JP | 2012-243476 | A | 12/2012 |
| JP | 2013-157084 | A | 8/2013 |
| JP | 2013-257992 | A | 12/2013 |
| JP | 2014-056818 | A | 3/2014 |
| JP | 2014-137892 | A | 7/2014 |
| JP | 2015-002052 | A | 1/2015 |
| JP | 2015-185237 | A | 10/2015 |
| JP | 2016-25027 | A | 2/2016 |
| KR | 10-2015-0132265 | A | 11/2015 |
| WO | 2012/173089 | A1 | 12/2012 |
| WO | 2013/136488 | A1 | 9/2013 |

OTHER PUBLICATIONS

International Search Report dated Apr. 4, 2017 from the International Bureau in counterpart International application No. PCT/JP2017/004029.

International Preliminary Report on Patentability and Translation of Written Opinion, dated Aug. 28, 2018 from the International Bureau in counterpart International application No. PCT/JP2017/004029.

Written Opinion, dated Apr. 4, 2017 from the International Bureau in counterpart International application No. PCT/JP2017/004029.

Communication dated Nov. 7, 2018, from the European Patent Office in counterpart European Application No. 17752997.1.

Communication dated Jul. 2, 2019, from the Japanese Patent Office in counterpart application No. 2018-500039.

Communication dated Nov. 29, 2019, issued by the Korean Intellectual Property Office in corresponding Korean Application No. 10-2018-7022413.

Communication dated Jan. 28, 2020 from Japanese Patent Office in corresponding JP Application No. 2018-500039.

Communication dated Aug. 17, 2020, from the China National Intellectual Property Administration in Application No. 201780005815.0.

* cited by examiner

SOLID ELECTROLYTE COMPOSITION, ELECTRODE SHEET FOR ALL-SOLID STATE SECONDARY BATTERY, ALL-SOLID STATE SECONDARY BATTERY, AND METHODS FOR MANUFACTURING ELECTRODE SHEET FOR ALL-SOLID STATE SECONDARY BATTERY AND ALL-SOLID STATE SECONDARY BATTERY

CROSS-REFERENCE TO RELATED APPLICATIONS

This application is a Continuation of PCT International Application No. PCT/JP2017/004029 filed on Feb. 3, 2017, which claims priority under 35 U.S.C. § 119 (a) to Japanese Patent Application No. 2016-030490 filed in Japan on Feb. 19, 2016. Each of the above applications is hereby expressly incorporated by reference, in its entirety, into the present application.

BACKGROUND OF THE INVENTION

1. Field of the Invention

The present invention relates to a solid electrolyte composition, an electrode sheet for an all-solid state secondary battery, an all-solid state secondary battery, and methods for manufacturing an electrode sheet for an all-solid state secondary battery and an all-solid state secondary battery.

2. Description of the Related Art

Lithium ion secondary batteries are storage batteries which have a negative electrode, a positive electrode, and an electrolyte sandwiched between the negative electrode and the positive electrode and which can be discharged and charged by lithium ions reciprocally migrating between both electrodes. In the related art, in lithium ion secondary batteries, organic electrolytic solutions have been used as electrolytes. However, organic electrolytic solutions are likely to cause liquid leakage, additionally, there is a concern that overcharging or over-discharging may cause short circuits and ignition in batteries, and there is a demand for further improving reliability and safety.

In such a circumstance, all-solid state secondary batteries in which an inorganic solid electrolyte is used instead of an organic electrolytic solution are attracting attention. In all-solid state secondary batteries, all of the negative electrode, the electrolyte, and the positive electrode are made of a solid, safety or reliability which is a problem of batteries in which an organic electrolytic solution is used can be significantly improved, and it becomes possible to extend the service lives of batteries. Furthermore, to all-solid state secondary batteries, it is possible to provide a structure in which electrodes and an electrolyte are disposed in series in a direct arrangement. Therefore, compared with secondary batteries in which an organic electrolytic solution is used, it becomes possible to increase the energy density, and the application to electric vehicles, large-sized storage batteries, and the like is expected.

For the above-described all-solid state secondary batteries, the use of two kinds of solid electrolytes is proposed. For example, JP2008-103203A describes an all-solid state secondary battery including a solid electrolyte produced by modifying the surface of a glass ceramic solid electrolyte with a glass solid electrolyte. In addition, JP2013-257992A describes an all-solid state battery including electrode active material layers having an active material, a first solid electrolyte material which is in contact with the active material, has an anion component that is different from an anion component of the active material, and is a single-phase electron-ion mixed conductor, and a second solid electrolyte material which is in contact with the first solid electrolyte material, has the same anion component as that of the first solid electrolyte material, and is an ion conductor having no electron conductivity.

SUMMARY OF THE INVENTION

In recent years, rapid development has been underway for all-solid state secondary batteries, and performance required for all-solid state secondary batteries has also enhanced. Particularly, the improvement of cycle characteristics is desired from the viewpoint of long-term use.

Regarding solid electrolytes that are used in all-solid state secondary batteries, it is known that sulfide-based inorganic solid electrolytes have a high ion conductivity. The use of sulfide-based inorganic solid electrolyte is also disclosed in JP2008-103203A and JP2013-257992A. However, sulfide-based inorganic solid electrolytes have a high reactivity, deteriorate in the process of charging and discharging, and degrade battery performance including cycle characteristics. In the inventions described in JP2008-103203A and JP2013-257992A, the above-described problems have not been sufficiently solved, and additional studies are required for the improvement of cycle characteristics in the case of using sulfide-based inorganic solid electrolytes.

Therefore, an object of the present invention is to provide a solid electrolyte composition which is used in an all-solid state secondary battery and capable of improving the cycle characteristics of the all-solid state secondary battery. In addition, another object of the present invention is to provide an electrode sheet for an all-solid state secondary battery and an all-solid state secondary battery in which the solid electrolyte composition is used. Furthermore, still another object of the present invention is to provide methods for manufacturing the electrode sheet for an all-solid state secondary battery and the all-solid state secondary battery.

As a result of intensive studies, the present inventors found that an all-solid state secondary battery produced using a solid electrolyte composition containing an active material, a sulfide-based inorganic solid electrolyte (a first sulfide-based inorganic solid electrolyte) which is in contact with the active material, contains a halogen element, and has a crystal phase at least in part, and a sulfide-based inorganic solid electrolyte (a second sulfide-based inorganic solid electrolyte) having a composition different from that of the first sulfide-based inorganic solid electrolyte has excellent cycle characteristics. The present invention has been completed by further repeating studies on the basis of the above-described finding.

That is, the above-described objects were achieved using the following means.

<1> A solid electrolyte composition comprising: an active material; a first sulfide-based inorganic solid electrolyte; and a second sulfide-based inorganic solid electrolyte having a composition different from that of the first sulfide-based inorganic solid electrolyte, in which the first sulfide-based inorganic solid electrolyte contains a halogen element and has a crystal phase at least in part, and the active material and the first sulfide-based inorganic solid electrolyte are in contact with each other.

<2> The solid electrolyte composition according to <1>, in which the active material is a positive electrode active material.

<3> The solid electrolyte composition according to <1>, in which the active material is a negative electrode active material.

<4> The solid electrolyte composition according to any one of <1> to <3>, in which the first sulfide-based inorganic solid electrolyte is represented by Formula (1), $$L_aMY_bX_c \qquad \text{Formula(1)}$$

in Formula (1), L represents at least one element selected from the group consisting of Li, Na, and K, M represents at least one element selected from the group consisting of Al, Ga, In, Si, Ge, Sn, P, As, Ti, Zr, V, Nb, and Ta, Y represents at least one element selected from the group consisting of O, S, and Se; here, a component represented by $Y_b$ includes at least S, X represents at least one element selected from the group consisting of Cl, Br, and I, $2 \le a < 12$, $2 \le b \le 8$, and $0 < c \le 5$.

<5> The solid electrolyte composition according to <4>, in which the first sulfide-based inorganic solid electrolyte is represented by Formula (2), $$Li_{7-x}PS_{6-x}X_x \qquad \text{Formula(2)}$$

in Formula (2), X is at least one element selected from the group consisting of Cl, Br, and I, and $0 < x \le 2$.

<6> The solid electrolyte composition according to <4> or <5>, in which X includes at least one element selected from the group consisting of Cl and Br.

<7> The solid electrolyte composition according to any one of <1> to <6>, further comprising: a binder.

<8> The solid electrolyte composition according to <7>, in which the binder has a particle shape.

<9> The solid electrolyte composition according to <7> or <8>, in which the binder is an acrylic latex, a urethane latex, and/or a urea latex.

<10> An electrode sheet for an all-solid state secondary battery comprising: a layer of the solid electrolyte composition according to any one of <1> to <9> on a collector.

<11> An all-solid state secondary battery comprising: a positive electrode active material layer; a negative electrode active material layer; and an inorganic solid electrolyte layer, in which at least one layer of the positive electrode active material layer and the negative electrode active material layer is a layer of the solid electrolyte composition according to any one of <1> to <9>.

<12> A method for manufacturing the electrode sheet for an all-solid state secondary battery according to <10>, comprising: the following steps of

[1] a step of bringing the active material and the first sulfide-based inorganic solid electrolyte into contact with each other; and

[2] a step of mixing the first sulfide-based inorganic solid electrolyte in contact with the active material and the second sulfide-based inorganic solid electrolyte.

<13> A method for manufacturing an all-solid state secondary battery, comprising: manufacturing an all-solid state secondary battery using the method for manufacturing an electrode sheet for an all-solid state secondary battery according to <12>.

In the present specification, numerical ranges expressed using "to" include numerical values before and after "to" as the lower limit value and the upper limit value.

In the present specification, in the case of being simply expressed, "acryl" or "(meth)acryl" refers to methacryl and/or acryl.

The solid electrolyte composition of the present invention exhibits an excellent effect of realizing favorable cycle characteristics by being used to produce an all-solid state secondary battery. In addition, the electrode sheet for an all-solid state secondary battery and the all-solid state secondary battery of the present invention use the solid electrolyte composition exhibiting an excellent effect and exhibit excellent performance.

In addition, according to the manufacturing methods of the present invention, it is possible to preferably manufacture the electrode sheet for an all-solid state secondary battery and the all-solid state secondary battery of the present invention respectively.

The above-described characteristics and advantages and other characteristics and advantages of the present invention will be further clarified from the following description with reference to the appropriately accompanied drawings.

DESCRIPTION OF THE PREFERRED EMBODIMENTS

A solid electrolyte composition of the present invention includes an active material, a first sulfide-based inorganic solid electrolyte, and a second sulfide-based inorganic solid electrolyte which will be described. Hereinafter, a preferred embodiment thereof will be described below, and, first, an all-solid state secondary battery in which the solid electrolyte composition of the present invention is used will be described.

[All-Solid State Secondary Battery]

An all-solid state secondary battery of the present invention has a positive electrode, a negative electrode facing the positive electrode, and a solid electrolyte layer between the positive electrode and the negative electrode. The positive electrode has a positive electrode active material layer on a positive electrode collector. The negative electrode has a negative electrode active material layer on a negative electrode collector.

At least one layer of the negative electrode active material layer and the positive electrode active material layer is formed of the solid electrolyte composition of the present invention, and particularly, the negative electrode active material layer and the positive electrode active material layer are preferably formed of the solid electrolyte composition of the present invention.

The kinds of the components and the content ratio therebetween of the active material layers formed of the solid electrolyte composition are preferably the same as those in the solid content of the solid electrolyte composition.

Hereinafter, a preferred embodiment of the present invention will be described, but the present invention is not limited thereto.

Figure 1:
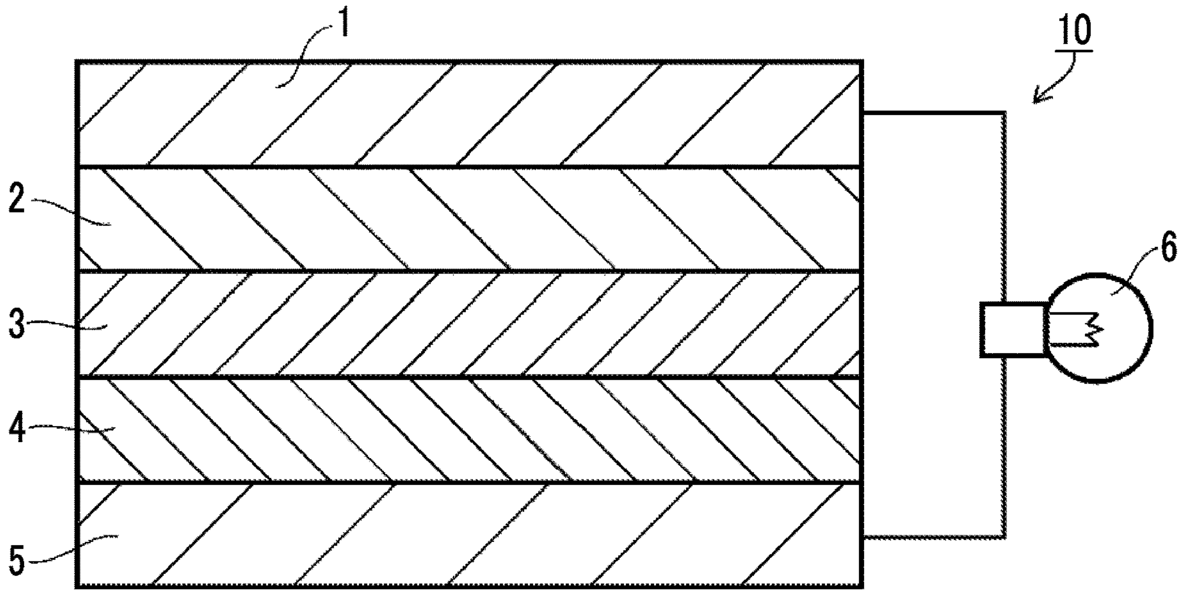
FIG. 1 is a vertical cross-sectional view schematically illustrating an all-solid state secondary battery according to a preferred embodiment of the present invention.

FIG. 1 is a cross-sectional view schematically illustrating an all-solid state secondary battery (lithium ion secondary battery) according to the preferred embodiment of the present invention. In the case of being seen from the negative electrode side, an all-solid state secondary battery 10 of the present embodiment has a structure in which a negative electrode collector 1, a negative electrode active material layer 2, a solid electrolyte layer 3, a positive electrode active material layer 4, and a positive electrode collector 5 are laminated in this order, and adjacent layers are in direct contact with each other. In a case in which the above-described structure is employed, during charging, electrons (e) are supplied to the negative electrode side, and lithium ions ($Li^+$) are accumulated thereon. On the other hand, during discharging, the lithium ions ($Li^+$) accumulated on the negative electrode return to the positive electrode side, and it is possible to supply electrons to an operation portion 6. In the example of the all-solid state secondary battery illustrated in the drawing, an electric bulb is employed as a model of the operation portion 6 and is lit by discharging. Hereinafter, there will be a case in which an all-solid state secondary battery having a layer constitution of FIG. 1 is referred to as an all-solid state secondary battery sheet.

[Positive Electrode Active Material Layer, Solid Electrolyte Layer, and Negative Electrode Active Material Layer]

In the all-solid state secondary battery 10, all of the positive electrode active material layer and the negative electrode active material layer are formed of the solid electrolyte composition of the present invention.

The solid electrolyte layer 3, generally, does not include any positive electrode active material and/or any negative electrode active material.

The positive electrode active material layer 4 and the negative electrode active material layer 2 respectively include at least one of a positive electrode active material or a negative electrode active material. Furthermore, the positive electrode active material layer 4 and the negative electrode active material layer 2 include an inorganic solid electrolyte. In a case in which the active material layer contains an inorganic solid electrolyte, it is possible to improve the ion conductivity.

The kinds of the inorganic solid electrolytes that the positive electrode active material layer 4, the solid electrolyte layer 3, and the negative electrode active material layer 2 contain may be identical to or different from each other.

In the present invention, there are cases in which any or both of the positive electrode active material layer and the negative electrode active material layer will be simply referred to as the active material layer or the electrode active material layer. In addition, there are cases in which any or both of the positive electrode active material and the negative electrode active material will be simply referred to as the active material or the electrode active material.

The thicknesses of the positive electrode active material layer 4, the solid electrolyte layer 3, and the negative electrode active material layer 2 are not particularly limited. In a case in which the dimensions of ordinary batteries are taken into account, the thicknesses of the respective layers are preferably 10 to 1,000 vim and more preferably 20 μm or more and less than 500 vim. In the all-solid state secondary battery of the present invention, the thickness of at least one layer of the positive electrode active material layer 4, the solid electrolyte layer 3, or the negative electrode active material layer 2 is still more preferably 50 μm or more and less than 500 vim.

[Collector (Metal Foil)]

The positive electrode collector 5 and the negative electrode collector 1 are preferably an electron conductor.

In the present invention, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum or an aluminum alloy is more preferred.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 to 500 μm. In addition, the surface of the collector is preferably provided with protrusions and recesses by means of a surface treatment.

In the present invention, a functional layer, member, or the like may be appropriately interposed or disposed between the respective layers of the negative electrode collector, the negative electrode active material layer, the solid electrolyte layer, the positive electrode active material layer, and the positive electrode collector or on the outside thereof. In addition, the respective layers may be constituted of a single layer or multiple layers.

[Chassis]

The basic structure of the all-solid state secondary battery can be produced by disposing the respective layers described above. Depending on the use, the basic structure alone may be used as an all-solid state secondary battery, but the basic structure may be used in a state of being further enclosed by an appropriate chassis in order to have a dry battery form. The chassis may be a metallic chassis or a resin (plastic) chassis. In a case in which a metallic chassis is used, examples thereof include an aluminum alloy chassis and a stainless-steel chassis. The metallic chassis is preferably classified into a positive electrode chassis and a negative electrode chassis and electrically connected to the positive electrode collector and the negative electrode collector respectively. The positive electrode chassis and the negative electrode chassis are preferably integrated by being joined together through a short circuit prevention gasket.

[Solid Electrolyte Composition]

The solid electrolyte composition of the present invention is as described above and will be specifically described below.

(Sulfide-Based Inorganic Solid Electrolyte)

The solid electrolyte composition of the present invention contains at least two different kinds of sulfide-based inorganic solid electrolytes. Hereinafter, there will be a case in which a sulfide-based inorganic solid electrolyte is simply referred to as the "inorganic solid electrolyte".

The solid electrolyte composition of the present invention includes the active material and includes at least the first sulfide-based inorganic solid electrolyte and the second sulfide-based inorganic solid electrolyte.

In the solid electrolyte composition of the present invention, the active material and the first sulfide-based inorganic solid electrolyte are in contact with each other. The first sulfide-based inorganic solid electrolyte preferably coats the active material.

Meanwhile, the solid electrolyte composition of the present invention may include the active material and the first sulfide-based inorganic solid electrolyte which are not in contact with each other.

A solid electrolyte of the inorganic solid electrolyte refers to a solid-form electrolyte capable of migrating ions therein. The solid electrolyte is clearly differentiated from organic solid electrolytes (polymer electrolytes represented by polyethylene oxide (PEO) or the like and organic electrolyte salts represented by lithium bis(trifluoromethanesulfonyl) imide (LiTFSI)) since the solid electrolyte does not include any organic substances as a principal ion-conductive material. In addition, the inorganic solid electrolyte is a solid in a static state and is thus not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, lithium bis(fluorosulfonyl) imide (LiFSI), LiCl, and the like). The inorganic solid electrolyte is not particularly limited as long as the inorganic solid electrolyte has conductivity for ions of metal elements belonging to Group I or II of the periodic table and is generally a substance not having electron conductivity. In a case in which the all-solid state secondary battery of the present invention is a lithium ion battery, the inorganic solid electrolyte preferably has ion conductivity for lithium ions.

As the inorganic solid electrolyte, it is possible to appropriately select and use solid electrolyte materials that are generally used in all-solid state secondary batteries. Typical examples of the inorganic solid electrolyte include (i) sulfide-based inorganic solid electrolytes and (ii) oxide-based inorganic solid electrolytes. In the present invention, a sulfide-based inorganic solid electrolyte having a great ion conductivity is used.

(First Sulfide-Based Inorganic Solid Electrolytes)

The first sulfide-based inorganic solid electrolyte that is used in the present invention contains a halogen element and has a crystal phase at least in part. Here, the fact that at least a part of the first sulfide-based inorganic solid electrolyte is a crystal phase means that a diffraction peak or a lattice fringe derived from a crystal structure is observed in X-ray diffraction or using a transmission electron microscope or the like.

In the case of containing a halogen element, the first sulfide-based inorganic solid electrolyte is capable of suppressing the content of a highly reactive sulfur element and maintaining a favorable ion conductivity. Furthermore, in a case in which at least a part of the first sulfide-based inorganic solid electrolyte is a crystal phase, a more favorable ion conduction path is formed in an electrode layer.

In a case in which the first sulfide-based inorganic solid electrolyte which satisfies the above-described requirements and is excellent in terms of ion conductivity and reaction resistance is interposed between the active material and the second sulfide-based inorganic solid electrolyte having a different composition from the first sulfide-based inorganic solid electrolyte, a solid interface that is more favorable than the interface between an active material and a solid electrolyte in an electrode layer of the related art is formed, and an excellent ion conductivity is obtained. Furthermore, the degradation of battery performance attributed to the high reactivity of a sulfur element is suppressed, and the contact state between the active material and the first sulfide-based inorganic solid electrolyte or the like is maintained without pressurization, whereby the battery service lives can be extended (the cycle characteristics become excellent). In addition, the above-described effect is not exhibited in a case in which the first sulfide-based inorganic solid electrolyte is used singly.

Here, the expression "without pressurization" refers to a case in which an all-solid state secondary battery is driven without being pressurized or an all-solid state secondary battery is driven by applying 1 MPa or less.

The first sulfide-based inorganic solid electrolyte that is used in the present invention is not particularly limited as long as the first sulfide-based inorganic solid electrolyte contains a halogen element and has a crystal phase at least in part.

The first sulfide-based inorganic solid electrolyte preferably contains a sulfur element (S), has an ion conductivity of a metal element belonging to Group I or II of the periodic table, and has an electron-insulating property. The first sulfide-based inorganic solid electrolyte preferably contains at least Li, S, and a halogen element and has a lithium ion conductivity, but may include an element other than Li, S, and a halogen element depending on the purpose or case.

Examples thereof include lithium ion-conductive inorganic solid electrolytes satisfying a composition represented by Formula (1), which are preferred.

$$L_aMY_bX_c \qquad \text{Formula(1)}$$

In Formula (1), L represents at least one element selected from the group consisting of Li, Na, and K. M represents at least one element selected from the group consisting of Al, Ga, In, Si, Ge, Sn, P, As, Ti, Zr, V, Nb, and Ta. Y represents at least one element selected from the group consisting of O, S, and Se. Here, a component represented by $Y_b$ includes at least S. X represents at least one element selected from the group consisting of Cl, Br, and I. $2 \leq a < 12$, $2 \leq b \leq 8$, and $0 < c \leq 5$.

Examples of the specific compounds of the first sulfide-based inorganic solid electrolyte include compounds obtained using a raw material composition containing $Li_2S$, a sulfide of an element belonging to Groups XIII to XV, and a lithium halide. More specifically, crystal or crystal and amorphous-mixed raw material compositions made of $Li_2S$—LiI—$P_2S_5$, $Li_2S$—LiI—$Li_2O$—$P_2S_5$, $Li_2S$—LiBr—$P_2S_5$, $Li_2S$—LiBr—$Li_2O$—$P_2S_5$, $Li_2S$—LiCl—$P_2S_5$, $Li_2S$—LiCl—$Li_2O$—$P_2S_5$, $Li_2S$—LiI—$Li_3PO_4$—$P_2S_5$, $Li_2S$—LiBr—$Li_3PO_4$—$P_2S_5$, $Li_2S$—LiCl—$Li_3PO_4$—$P_2S_5$, $Li_2S$—LiBr—$P_2S_5$—$P_2O_5$, $Li_2S$—LiI—$P_2S_5$—$P_2O_5$, $Li_2S$—LiCl—$P_2S_5$—$P_2O_5$, $Li_2S$—LiI—$P_2S_5$—$SiS_2$, $Li_2S$—LiBr—$P_2S_5$—$SiS_2$, $Li_2S$—LiCl—$P_2S_5$—$SiS_2$, $Li_2S$—LiI—$P_2S_5$—SnS, $Li_2S$—LiBr—$P_2S_5$—SnS, $Li_2S$—LiCl—$P_2S_5$—SnS, $Li_2S$—LiI—$P_2S_5$—$Al_2S_3$, $Li_2S$—LiBr—$P_2S_5$—$Al_2S_3$, $Li_2S$—LiCl—$P_2S_5$—$Al_2S_3$, $Li_2S$—LiI—$GeS_2$, $Li_2S$—LiBr—$GeS_2$, $Li_2S$—LiCl—$GeS_2$, $Li_2S$—LiI—$GeS_2$—ZnS, $Li_2S$—LiBr—$GeS_2$—ZnS, $Li_2S$—LiCl—$GeS_2$—ZnS, $Li_2S$—LiI—$Ga_2S_3$, $Li_2S$—LiBr—$Ga_2S_3$, $Li_2S$—LiCl—$Ga_2S_3$, $Li_2S$—LiI—$GeS_2$—$Ga_2S_3$, $Li_2S$—LiBr—$GeS_2$—$Ga_2S_3$, $Li_2S$—LiCl—$GeS_2$—$Ga_2S_3$, $Li_2S$—LiI—$GeS_2$—$P_2S_5$, $Li_2S$—LiBr—$GeS_2$—$P_2S_5$, $Li_2S$—LiCl—$GeS_2$—$P_2S_5$, $Li_2S$—LiI—$GeS_2$—$Sb_2S_5$, $Li_2S$—LiBr—$GeS_2$—$Sb_2S_5$, $Li_2S$—LiCl—$GeS_2$—$Sb_2S_5$, $Li_2S$—LiI—$GeS_2$—$Al_2S_3$, $Li_2S$—LiBr—$GeS_2$—$Al_2S_3$, $Li_2S$—LiCl—$GeS_2$—$Al_2S_3$, $Li_2S$—LiI—$SiS_2$, $Li_2S$—LiBr—$SiS_2$, $Li_2S$—LiCl—$SiS_2$, $Li_2S$—LiI—$Al_2S_3$, $Li_2S$—LiBr—$Al_2S_3$, $Li_2S$—LiCl—$Al_2S_3$, $Li_2S$—LiI—$SiS_2$—$Al_2S_3$, $Li_2S$—LiBr—$SiS_2$—$Al_2S_3$, $Li_2S$—LiCl—$SiS_2$—$Al_2S_3$, $Li_2S$—LiI—$SiS_2$—$P_2S_5$, $Li_2S$—LiBr—$SiS_2$—$P_2S_5$, $Li_2S$—LiCl—$SiS_2$—$P_2S_5$, $Li_2S$—LiI—$SiS_2$—$Li_4SiO_4$, $Li_2S$—LiBr—$SiS_2$—$Li_4SiO_4$, $Li_2S$—LiCl—$SiS_2$—$Li_4SiO_4$, $Li_2S$—LiI—$SiS_2$—$Li_3PO_4$, $Li_2S$—LiBr—$SiS_2$—$Li_3PO_4$, $Li_2S$—LiCl—$SiS_2$—$Li_3PO_4$, $Li_{10}GeP_2S_{12}$—LiI, $Li_{10}GeP_2S_{12}$—LiBr, or $Li_{10}$ $GeP_2S_{12}$—LiCl are preferred due to their high lithium ion conductivity.

A method for synthesizing a sulfide-based inorganic solid electrolyte material using the above-described raw material composition is preferably a mechanical milling method. This is because treatments at a normal temperature become possible, and it is possible to simplify manufacturing steps.

From the viewpoint of forming a favorable interface between the active material and the first sulfide-based inorganic solid electrolyte, the first sulfide-based inorganic solid electrolyte is more preferably represented by Formula(2).

$$Li_{7-x}PS_{6-x}X_x \qquad \text{Formula(2)}$$

In Formula (2), X is at least one element selected from the group consisting of Cl, Br, and I, and $0<x\leq 2$.

In Formula (2), from the viewpoint of ion conductivity and reaction resistance, X preferably includes at least one element selected from the group consisting of Cl and Br, and $0<x\leq 1.5$ is preferred.

The first sulfide-based inorganic solid electrolyte can be manufactured from a reaction between any of [1] to [3] and a lithium halide (LiX).

[1] Lithium sulfide ($Li_2S$) and phosphorus sulfide (for example, diphosphorus pentasulfide ($P_2S_5$)), [2] lithium sulfide and at least one of a phosphorus single body and a sulfur single body, or [3] lithium sulfide, phosphorus sulfide (for example, diphosphorus pentasulfide ($P_2S_5$)), and at least one of a phosphorus single body and a sulfur single body In the reaction between any of [1] to [3] and a lithium halide, in a case in which the ratio between Li, P, S, and X is adjusted so as to satisfy Formula (2), it is possible to further increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

(Second Sulfide-Based Inorganic Solid Electrolytes)

The second sulfide-based inorganic solid electrolyte is not particularly limited as long as the composition thereof is different from that of the first sulfide-based inorganic solid electrolyte.

The composition being different means that the kinds of elements constituting the first sulfide-based inorganic solid electrolyte and/or the ratios therebetween and the kinds of elements constituting the second sulfide-based inorganic solid electrolyte and/or the ratios therebetween are different from each other.

The second sulfide-based inorganic solid electrolyte preferably contains a sulfur element (S), has an ion conductivity of a metal element belonging to Group I or II of the periodic table, and has an electron-insulating property. The second sulfide-based inorganic solid electrolyte preferably contains at least Li and S as elements and has a lithium ion conductivity, but may include an element other than Li and S depending on the purpose or case.

Examples thereof include lithium ion-conductive inorganic solid electrolytes satisfying a composition represented by Formula (A), which are preferred.

$$L_{a1}M_{b1}S_{c1}A_{d1} \qquad \text{(A)}$$

In Formula (A), L represents an element selected from Li, Na, and K and is preferably Li.

M represents an element selected from B, Zn, Sn, Si, Cu, Ga, Sb, Al, P, Ge, In, As, V, Nb, Ta, Ti, and Zr. Among these, B, Sn, Si, Al, P, or Ge is preferred, and Sn, Al, P, or Ge is more preferred.

A represents I, Br, Cl, and F and is preferably I or Br and particularly preferably I.

As L, M, and A, it is possible to use one or more elements described above respectively.

a1 to d1 represent the compositional ratios among the respective elements, and a1:b1:c1:d1 satisfies 1 to 12:0 to 2:2 to 12:0 to 5. Furthermore, a1 is preferably 1 to 9 and more preferably 1.5 to 4. b1 is preferably 0 to 1. Furthermore, c1 is preferably 3 to 7 and more preferably 4 to 6. Furthermore, d1 is preferably 0 to 3 and more preferably 0 to 1.

The compositional ratios among the respective elements can be controlled by adjusting the amounts of raw material compounds blended to manufacture the second sulfide-based inorganic solid electrolyte as described below.

The second sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The second sulfide-based inorganic solid electrolytes can be manufactured from a reaction between [1] lithium sulfide ($Li_2S$) and phosphorus sulfide (for example, diphosphorus pentasulfide ($P_2S_5$)), [2] lithium sulfide and at least one of a phosphorus single body and a sulfur single body, or [3] lithium sulfide, phosphorus sulfide (for example, diphosphorus pentasulfide ($P_2S_5$)), and at least one of a phosphorus single body and a sulfur single body.

The ratio between $Li_2S$ and $P_2S_5$ in the Li—P—S-based glass and the Li—P—S-based glass ceramic is preferably 65:35 to 85:15 and more preferably 68:32 to 77:23 in terms of the molar ratio between $Li_2S$:$P_2S_5$. In a case in which the ratio between $Li_2S$ and $P_2S_5$ is set in the above-described range, it is possible to further increase the lithium ion conductivity.

Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

Examples of the specific compounds of the second sulfide-based inorganic solid electrolyte include compounds obtained using a raw material composition containing $Li_2S$ and a sulfide of an element belonging to Groups XIII to XV. More specific examples thereof include $Li_2S$—$P_2S$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Among these, crystal, amorphous, or crystal and amorphous-mixed raw material compositions made of $Li_2S$—$P_2S_5$, $Li_2S$—$GeS_2$—$Ga_2S_3$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—LiI—$Li_2O$—$P_2S_5$, $Li_2S$—$Li_2O$—$P_2S_5$, $Li_2S$—$Li_3PO_4$—$P_2S_5$, $Li_2S$—$GeS_2$—$P_2S_5$, or $Li_{10}GeP_2S_{12}$ are preferred due to their high lithium ion conductivity. Examples of a method for synthesizing a sulfide-based inorganic solid electrolyte material using the above-described raw material composition include an amorphorization method. Examples of the amorphorization method include a mechanical milling method, and a melting quenching method. Among these, the mechanical milling method is preferred. This is because treatments at a normal temperature become possible, and it is possible to simplify manufacturing steps.

Among these, $Li_2S$—$P_2S_5$, LGPS ($Li_{10}GeP_2S_{12}$), $Li_2S$—$P_2S_5$—$SiS_2$, and the like are preferred.

The inorganic solid electrolyte is preferably particles. The average particle diameter of the particulate inorganic solid electrolyte is not particularly limited, but the average particle diameters of both the first sulfide-based inorganic solid electrolyte and the second sulfide-based inorganic solid electrolyte are preferably 0.01 μm or more and more preferably 0.1 μm or more. The upper limit is preferably 100 μm or less and more preferably 50 μm or less.

In the present invention, the ratio of the average particle diameter between the first sulfide-based inorganic solid electrolyte and the second sulfide-based inorganic solid electrolyte is not particularly limited, but is preferably 0.001:1 to 1:1, more preferably 0.001:1 to 0.5:1, and particularly preferably 0.01:1 to 0.5:1.

Meanwhile, the average particle diameter of the inorganic solid electrolyte can be measured using, for example, a scanning electron microscope (SEM) or a transmission electron microscope (TEM). An electrode sheet for an all-solid state secondary battery is observed using an electron microscope, and 100 particles are randomly selected from the primary particles of the inorganic solid electrolyte in the sheet. The average particle diameter of the inorganic solid electrolyte refers to a value obtained by measuring the horizontal Feret's diameters and the vertical Feret's diameters of the primary particles and averaging the larger measurement values of them. Meanwhile, in a case in which the horizontal Feret's diameter and the vertical Feret's diameter are equal to each other, any measurement value may be used.

In a case in which the satisfaction of both the battery performance and the interface resistance-reducing and maintaining effect is taken into account, the total contents of the first sulfide-based inorganic solid electrolyte and the second sulfide-based inorganic solid electrolyte in the solid electrolyte composition are respectively preferably 1% by mass or more, more preferably 10% by mass or more, and particularly preferably 20% by mass or more with respect to 100% by mass of the solid content. From the same viewpoint, the upper limit is preferably 99% by mass or less, more preferably 90% by mass or less, and particularly preferably 80% by mass or less.

The ratio between the content of the first sulfide-based inorganic solid electrolyte and the content of the second sulfide-based inorganic solid electrolyte is not particularly limited, but is preferably 0.001:1 to 1:1, more preferably 0.001:1 to 0.5:1, and particularly preferably 0.01:1 to 0.5:1.

Meanwhile, the solid content in the present specification refers to a component that does not disappear due to volatilization or evaporation in the case of being dried at 170° C. for six hours in a nitrogen atmosphere. Typically, the solid content indicates components other than a dispersion medium described below.

Each of the first sulfide-based inorganic solid electrolyte and the second sulfide-based inorganic solid electrolyte may be used singly or two or more inorganic solid electrolytes may be used in combination.

(Binder)

The solid electrolyte composition of the present invention also preferably contains a binder. A binder that is included in the solid electrolyte composition is capable of strongly bonding the inorganic solid electrolytes and the solid particles of the active materials and the like and, furthermore, decreasing the interface resistance between the solid particles and the like. Hereinafter, there will be a case in which a resin is used as the same terminology as a polymer.

The binder that is used in the present invention is not particularly limited as long as the binder is an organic polymer.

The binder that can be used in the present invention is preferably a binder that is generally used as a binding agent for a positive electrode active material layer or a negative electrode active material layer of a battery material, is not particularly limited, and is preferably, for example, a binder made of a resin described below.

Examples of a fluorine-containing resin include polytetrafluoroethylene (PTFE), polyvinylene difluoride (PVdF), copolymers of polyvinylene difluoride and hexafluoropropylene (PVdF-HFP), and the like.

Examples of a hydrocarbon-based thermoplastic resin include polyethylene, polypropylene, styrene butadiene rubber (SBR), hydrogenated styrene butadiene rubber (HSBR), butylene rubber, acrylonitrile butadiene rubber, polybutadiene, polyisoprene, and the like.

Examples of an acrylic resin (preferably an acrylic latex) include polymethyl (meth)acrylate, polyethyl (meth)acrylate, polyisopropyl (meth)acrylate, polyisobutyl (meth)acrylate, polybutyl (meth)acrylate, polyhexyl (meth)acrylate, polyoctyl (meth)acrylate, polydodecyl (meth)acrylate, polystearyl (meth)acrylate, poly 2-hydroxyethyl (meth)acrylate, poly(meth)acrylate, polybenzyl (meth)acrylate, polyglycidyl (meth)acrylate, polydimethylaminopropyl (meth)acrylate, and copolymers of monomers constituting the above-described resins.

In addition, copolymers with other vinyl-based monomers are also preferably used. Examples thereof include polymethyl (meth)acrylate-polystyrene copolymers, polymethyl (meth)acrylate-acrylonitrile copolymers, polybutyl (meth) acrylate-acrylonitrile-styrene copolymers, and the like.

Other than the radical polymerization-based polymer, a polycondensation-based polymer can also be used. As the polycondensation-based polymer, it is possible to preferably use a urethane resin (preferably a urethane latex), a urea resin (preferably a urea latex), an amide resin, an imide resin, a polyester resin, or the like.

The polycondensation-based polymer preferably has a hard segment portion and a soft segment portion. The hard segment portion refers to a portion capable of forming an intermolecular hydrogen bond, and the soft segment portion generally refers to a flexible portion which has a glass transition temperature (Tg) of room temperature (25° C.±5° C.) or lower and a molecular weight of 400 or more.

In the present invention, the binder may be used singly or two or more binders may be used in combination.

In the present invention, at least one selected from the group consisting of an acrylic latex, a urethane latex, and a urea latex is preferably used from the viewpoint of the improvement of the bonding property of the electrode sheet for an all-solid state secondary battery (the improvement of the handleability of the sheet) and battery performance.

Regarding the glass transition temperature of the binder, the upper limit is preferably 50° C. or lower, more preferably 0° C. or lower, and particularly preferably −20° C. or lower. The lower limit is preferably −100° C. or higher, more preferably −70° C. or higher, and particularly preferably −50° C. or higher.

The glass transition temperature (Tg) is measured using a dried specimen and a differential scanning calorimeter "X-DSC7000" (trade name, manufactured by SII•NanoTechnology Inc.) under the following conditions. The glass transition temperature of the same specimen is measured twice, and the measurement result of the second measurement is employed.

Atmosphere in the measurement chamber: Nitrogen (50 mL/min)

Temperature-increase rate: 5° C./min

Measurement-start temperature: −100° C.

Measurement-end temperature: 200° C.

Specimen pan: Aluminum pan

Mass of the measurement specimen: 5 mg

Calculation of Tg: Tg is calculated by rounding off the middle temperature between the declination-start point and the declination-end point in the DSC chart to the integer.

The polymer constituting the binder that is used in the present invention preferably has a moisture concentration of 100 ppm or less (mass-based) and a Tg of 100° C. or lower.

In addition, the polymer constituting the binder that is used in the present invention may be dried by being crystallized or may be used in a polymer solution form. The amount of a metal-based catalyst (a urethanization or polyesterification catalyst=tin, titanium, or bismuth) is preferably small. The concentration of metal in copolymers is preferably set to 100 ppm or less (mass-based) by decreasing the amount of the metal during polymerization or removing the catalyst by means of crystallization.

The solvent that is used for the polymerization reaction of the polymer is not particularly limited. Meanwhile, solvents that do not react with the inorganic solid electrolyte or the active materials and furthermore do not decompose the inorganic solid electrolyte or the active materials are desirably used. For example, it is possible to use hydrocarbon-based solvents (toluene, heptane, and xylene), ester-based solvents (ethyl acetate and propylene glycol monomethyl ether acetate), ether-based solvents (tetrahydrofuran, dioxane, and 1,2-diethoxyethane), ketone-based solvents (acetone, methyl ethyl ketone, and cyclohexanone), nitrile-based solvents (acetonitrile, propionitrile, butyronitrile, and isobutyronitrile), halogen-based solvents (dichloromethane and chloroform), and the like.

The mass average molecular weight of the polymer constituting the binder that is used in the present invention is preferably 10,000 or more, more preferably 20,000 or more, and still more preferably 50,000 or more. The upper limit is preferably 1,000,000 or less, more preferably 200,000 or less, and still more preferably 100,000 or less.

In the present invention, the molecular weight of the polymer refers to the mass average molecular weight unless particularly otherwise described. The mass average molecular weight can be measured as the polystyrene-equivalent molecular weight by means of gel permeation chromatography (GPC). At this time, the polystyrene-equivalent molecular weight is detected by means of RI using a GPC apparatus HLC-8220 (manufactured by Tosoh Corporation) and G3000HXL+G2000HXL as columns at 23° C. and a flow rate of 1 mL/min. An eluent can be selected from tetrahydrofuran (THF), chloroform, N-methyl-2-pyrrolidone (NMP), and m-cresol/chloroform (manufactured by Shonanwako Junyaku), and THF is used in a case in which the polymer needs to be dissolved.

In a case in which favorable interface resistance-reducing and maintaining properties are taken into account when the binder is used in the all-solid state secondary battery, the content of the binder in the solid electrolyte composition is preferably 0.01% by mass or more, more preferably 0.1% by mass or more, and still more preferably 1% by mass or more with respect to 100% by mass of the solid components. From the viewpoint of battery characteristics, the upper limit is preferably 20% by mass or less, more preferably 10% by mass or less, and still more preferably 8% by mass or less.

The binder that is used in the present invention is also preferably polymer particles holding a particle shape. Compared with binders having a non-particle shape, the binder holding a particle shape does not easily allow the formation of an excess coating on the active materials or the solid electrolyte and enables the suppression of battery resistance at a low level without impairing the ion conductivity.

Here, the "polymer particles" refer to particles which are not completely dissolved even in the case of being added to a dispersion medium described below, are dispersed in the dispersion medium while maintaining the particle shape, and exhibit an average particle diameter of more than 0.01 μm.

The shape of the polymer particle is not limited as long as the polymer particle hold a solid form. The polymer particles may be monodispersed or polydispersed. The polymer particle may have a truly spherical shape or a flat shape and, furthermore, may have an irregular shape. The surface of the polymer particle may be flat or form an uneven shape. The polymer particle may have a core-shell structure, and the core (inner core) and the shell (outer shell) may be constituted of the same material or may be constituted of different materials. In addition, the polymer particle may be hollow, and the hollow rate is also not limited.

The polymer particles can be synthesized using a method in which the polymer particles are polymerized in the presence of a surfactant, an emulsifier, or a dispersant or a method in which the polymer particles are precipitated in a crystal shape as the molecular weight increases.

In addition, a method in which the existing polymer is mechanically crushed or a method in which fine particles are produced from a polymer liquid by means of re-precipitation.

The average particle diameter of the polymer particles is preferably 0.01 μm to 100 μm, more preferably 0.05 μm to 50 μm, still more preferably 0.1 μm to 20 μm, and particularly preferably 0.2 μm to 10 μm.

Unless particularly otherwise described, the average particle diameter of the polymer particles that are used in the present invention refers to an average particle diameter according to measurement conditions and a definition described below.

One percent by mass of a dispersion liquid is diluted and prepared using the polymer particles and a random solvent (a dispersion medium that is used to prepare the solid electrolyte composition of the present invention, for example, heptane) in a 20 ml sample bottle. The diluted dispersion specimen is irradiated with 1 kHz ultrasonic waves for 10 minutes and then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., thereby obtaining a volume-average particle diameter which is used as the average particle diameter. Regarding other detailed conditions and the like, the description of JS Z8828:2013 "Particle size analysis-Dynamic light scattering method" is referred to as necessary. Five specimens are produced and measured per level, and the average values thereof are employed.

Meanwhile, the average particle diameter can be measured from the produced all-solid state secondary battery by, for example, disassembling the battery, peeling the electrodes, measuring the average particle diameters of the electrode materials according to the above-described method for measuring the average particle diameter of the polymer particles, and excluding the measurement value of the average particle diameter of particles other than the polymer particles which has been measured in advance.

Meanwhile, as the binder that is used in the present invention, a commercially available product can be used. In addition, the binder can also be prepared using an ordinary method.

(Active Material)

The solid electrolyte composition of the present invention contains an active material capable of intercalating and deintercalating ions of metal elements belonging to Group I or II of the periodic table. Examples of the active material include a positive electrode active material and a negative electrode active material which will be described below, and a transition metal oxide which is a positive electrode active material or graphite which is a negative electrode active material is preferred.

In the present invention, the solid electrolyte composition containing an active material (a positive electrode active material or a negative electrode active material) will be referred to as a composition for an electrode layer (a composition for a positive electrode layer or a composition for a negative electrode layer) in some cases.

—Positive Electrode Active Material—

A positive electrode active material that the solid electrolyte composition of the present invention may contain is preferably a positive electrode active material capable of reversibly intercalating and deintercalating lithium ions. The above-described material is not particularly limited as long as the material has the above-described characteristics and may be transition metal oxides, elements capable of being complexed with Li such as sulfur, or the like.

Among these, as the positive electrode active material, transition metal oxides are preferably used, and transition metal oxides having a transition metal element $M^a$ (one or more elements selected from Co, Ni, Fe, Mn, Cu, and V) are more preferred. In addition, an element $M^b$ (an element of Group I (Ia) of the metal periodic table other than lithium, an element of Group II (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. The positive electrode active material is more preferably synthesized by mixing the element into the transition metal oxide so that the molar ratio of $Li/M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNiO_2$ (lithium nickelate), $LiNi_{0.85}Co_{0.10}Al_{0.05}O_2$ (lithium nickel cobalt aluminum oxide [NCA]), $LiNi_{0.33}Co_{0.33}Mn_{0.33}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$, $LiCoMnO_4$, $Li_2FeMn_3O_8$, $Li_2CuMn_3O_8$, $Li_2CrMn_3O$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, and cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

The shape of the positive electrode active material is not particularly limited, but is preferably a particle shape. The volume-average particle diameter (circle-equivalent average particle diameter) of the positive electrode active material is not particularly limited. For example, it is possible to set the volume-average particle diameter to 0.1 to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

The positive electrode active material may be used singly or two or more positive electrode active materials may be used in combination.

In the case of forming the positive electrode active material layer, the mass (mg) of the positive electrode active material per unit area ($cm^2$) of the positive electrode active material layer (weight per unit area) is not particularly limited, and can be appropriately determined depending on the set battery capacity.

The content of the positive electrode active material in the solid electrolyte composition is not particularly limited, but is preferably 10% to 95% by mass and particularly preferably 20% to 90% by mass with respect to 100% by mass of the solid content.

—Negative Electrode Active Material—

A negative electrode active material that the solid electrolyte composition of the present invention may contain is preferably a negative electrode active material capable of reversibly intercalating and deintercalating lithium ions. The above-described material is not particularly limited as long as the material has the above-described characteristics, and examples thereof include carbonaceous materials, metal oxides such as tin oxide and silicon oxide, metal complex oxides, a lithium single body or lithium alloys such as lithium aluminum alloys, metals capable of forming alloys with lithium such as Sn, Si, and In and the like. Among these, carbonaceous materials or lithium complex oxides are preferably used in terms of reliability. In addition, the metal complex oxides are preferably capable of absorbing and deintercalating lithium. The materials are not particularly limited, but preferably contain titanium and/or lithium as constituent components from the viewpoint of high-current density charging and discharging characteristics.

The carbonaceous material that is used as the negative electrode active material is a material substantially made of carbon. Examples thereof include petroleum pitch, carbon black such as acetylene black (AB), graphite (natural graphite, artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, planar graphite, and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKα rays are used and may have crystalline diffraction lines. The highest intensity in the crystalline diffraction line appearing at the 2θ value of 40° or more and 70° or less is preferably 100 times or less and more preferably five times or less of the diffraction line intensity at the peak of the broad scattering line appearing at the 2θ value of 20° or more and 40° or less and particularly preferably does not have any crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the absorption and emission of lithium ions is small and thus the high-speed charging and discharging characteristics are excellent and the deterioration of electrodes is suppressed, whereby it becomes possible to improve the service lives of lithium ion secondary batteries.

In the present invention, hard carbon or graphite is preferably used, and graphite is more preferably used. Meanwhile, in the present invention, the carbonaceous material may be used singly or two or more carbonaceous materials may be used in combination.

The shape of the negative electrode active material is not particularly limited, but is preferably a particle shape. The average particle diameter of the negative electrode active material is preferably 0.1 to 60 μm. In order to provide a predetermined particle diameter, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out. The average particle diameter of negative electrode active material particles can be measured using the same method as the method for measuring the volume-average particle diameter of the positive electrode active material.

The chemical formulae of the compounds obtained using a firing method can be computed using an inductively coupled plasma (ICP) emission spectroscopic analysis method as a measurement method or from the mass difference of powder before and after firing as a convenient method.

Preferred examples of negative electrode active materials that can be jointly used with the amorphous oxide negative electrode active material mainly including Sn, Si, or Ge include carbonaceous materials capable of absorbing and emitting lithium ions or lithium metal, lithium, lithium alloys, and metal capable of forming an alloy with lithium.

In the present invention, a Si-based negative electrode is also preferably applied. Generally, a Si negative electrode is capable of absorbing a larger number of Li ions than carbon negative electrodes (graphite, acetylene black, and the like). That is, the amount of Li ions absorbed per unit weight increases. Therefore, it is possible to increase the battery capacity. As a result, there is an advantage that the driving time of batteries can be extended.

The negative electrode active material may be used singly or two or more negative electrode active materials may be used in combination.

In the case of forming a negative electrode active material layer, the mass (mg) of the negative electrode active material per unit area ($cm^2$) in the negative electrode active material layer (weight per unit area) is not particularly limited and can be appropriately determined depending on the set battery capacity.

The content of the negative electrode active material in the solid electrolyte composition is not particularly limited, but is preferably 10% to 95% by mass and particularly preferably 20% to 90% by mass with respect to 100% by mass of the solid content.

(Dispersion Medium)

The solid electrolyte composition of the present invention preferably contains a dispersion medium.

The dispersion medium needs to be capable of dispersing the respective components described above, and examples thereof include a variety of organic solvents. Specific examples of the dispersion medium include dispersion media described below.

Examples of alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of ether compound solvents include alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, and the like), dialkyl ethers (dimethyl ether, diethyl ether, diisopropyl ether, dibutyl ether, and the like), and cyclic ethers (tetrahydrofuran, dioxane (including each of 1,2-, 1,3- and 1,4-isomers)).

Examples of amide compound solvents include N,N-dimethylformamide, N-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, hexamethylphosphoric triamide, and the like.

Examples of amino compound solvents include triethylamine, diisopropylethylamine, tributylamine, and the like.

Examples of ketone compound solvents include acetone, methyl ethyl ketone, methyl isobutyl ketone, and cyclohexanone.

Examples of aromatic compound solvents include benzene, toluene, xylene, and the like.

Examples of aliphatic compound solvents include hexane, heptane, octane, decane, and the like.

Examples of nitrile compound solvents include acetonitrile, propionitrile, butyronitrile, and the like.

Examples of ester compound solvents include ethyl acetate, butyl acetate, propyl acetate, butyl butyrate, butyl pentanoate, and the like.

Examples of non-aqueous dispersion media include the aromatic compound solvents, the aliphatic compound solvents, and the like.

(Auxiliary Conductive Agent)

The solid electrolyte composition of the present invention may also appropriately contain an auxiliary conductive agent that is used to improve the electron conductivity of the active materials as necessary. As the auxiliary conductive agent, ordinary auxiliary conductive agents can be used. The auxiliary conductive agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene, all of which are electron-conductive materials, or may be metal powder or a metal fiber of copper, nickel, or the like, and a conductive polymer such as polyaniline, polypyrrole, polythiophene, polyacetylene, or a polyphenylene derivative may also be used. In addition, these auxiliary conductive agents may be used singly or two or more auxiliary conductive agents may be used.

The content of the auxiliary conductive agent in the solid electrolyte composition of the present invention is preferably 0% to 10% by mass.

(Lithium Salt)

The solid electrolyte composition of the present invention preferably contains a lithium salt.

The lithium salt is preferably a lithium salt that is ordinarily used in this kind of products and is not particularly limited. Examples thereof include LiTFSI and the lithium salts described in Paragraphs 0082 to 0085 of JP2015-088486A.

The content of the lithium salt is preferably 0 parts by mass or more and more preferably 5 parts by mass or more with respect to 100 parts by mass of the solid electrolyte. The upper limit is preferably 50 parts by mass or less and more preferably 20 parts by mass or less.

(Dispersant)

The solid electrolyte composition of the present invention may contain a dispersant. In a case in which the dispersant is added to the solid electrolyte composition, it is possible to suppress the agglomeration of the electrode active material or the inorganic solid electrolyte and form a uniform active material layer even in a case in which the concentration of any of the electrode active material or the inorganic solid electrolyte is high.

As the dispersant, a dispersant that is ordinarily used in all-solid state secondary batteries can be appropriately selected and used. For example, a dispersant which is made of a low-molecular-weight molecule or an oligomer having a molecular weight of 200 or more and less than 3,000 and contains a functional group represented by a group of functional groups (I) and an alkyl group having 8 or more carbon atoms or an aryl group having 10 or more carbon atoms in the same molecule is preferred.

Group of functional groups (I): an acidic group, a group having a basic nitrogen atom, a (meth)acryl group, a (meth)acrylamide group, an alkoxysilyl group, an epoxy group, an oxetanyl group, an isocyanate group, a cyano group, a mercapto group, and a hydroxy group (an acidic group, a group having a basic nitrogen atom, an alkoxysilyl group, a cyano group, a mercapto group, and a hydroxy group are preferred, and a carboxy group, a sulfonic acid group, a cyano group, an amino group, and a hydroxy group are more preferred).

In a case in which there is a layer including the dispersant in the all-solid state secondary battery of the present invention, the content of the dispersant in the layer is preferably 0.2% to 10% by mass.

(Preparation of Solid Electrolyte Composition)

A method for bringing the active material and the first sulfide-based inorganic solid electrolyte into contact with each other is not particularly limited. For example, the active material is injected into a solution obtained by dissolving the first sulfide-based inorganic solid electrolyte in the dispersion medium and stirred at room temperature (20° C. to 30° C.) for one to sixty minutes. After that, the solution is dried under a reduced pressure at 80° C. to 300° C. for 0.5 to five hours, whereby it is possible to bring the active material and the first sulfide-based inorganic solid electrolyte into contact with each other.

The solid electrolyte composition of the present invention can be prepared by mixing or adding the active material which the first sulfide-based inorganic solid electrolyte is in contact with, the second sulfide-based inorganic solid electrolyte, and, as necessary, other components such as the binder particles and the dispersion medium.

Meanwhile, an aspect in which the first sulfide-based inorganic solid electrolyte is in contact with the active material is not particularly limited, and examples thereof include an aspect in which the first sulfide-based inorganic solid electrolyte evenly or unevenly coats all or part of the surface of the active material.

The above-described components can be mixed using, for example, a variety of mixers. The mixing conditions are not particularly limited, and examples thereof include a ball mill, a bead mill, a planetary mixer, a blade mixer, a roll mill, a kneader, a disc mill, and the like.

[Sheet for All-Solid State Secondary Battery]

In the present invention, a sheet for an all-solid state secondary battery is a sheet that is used for all-solid state secondary batteries and includes a variety of aspects depending on the use. Examples thereof include a sheet that is preferably used in a solid electrolyte layer (also referred to as a solid electrolyte sheet for an all-solid state secondary battery), a sheet that is preferably used in an electrode or a laminate of an electrode and a solid electrolyte layer (an electrode sheet for an all-solid state secondary battery), and the like. In the present invention, there are cases in which a variety of sheets described above will be collectively referred to as the sheet for an all-solid state secondary battery.

The sheet for an all-solid state secondary battery that is used in the present invention is a sheet having a solid electrolyte layer or an active material layer (an electrode layer) on a base material. This sheet for an all-solid state secondary battery may have other layers as long as the sheet has a base material and a solid electrolyte layer or an active material layer, and a sheet having an active material layer is classified as an electrode sheet for an all-solid state secondary battery described below. Examples of other layers include a protective layer, a collector, a coating layer (a collector, another solid electrolyte layer, or another active material layer), and the like.

Examples of the solid electrolyte sheet for an all-solid state secondary battery that is used in the present invention include a sheet having a solid electrolyte layer and a protective layer on a base material in this order.

The base material is not particularly limited as long as the base material is capable of supporting the solid electrolyte layer, and examples thereof include sheet bodies (plate-like bodies) of the materials, the organic materials, the inorganic materials, and the like which have been described in the section of the collector. Examples of the organic materials include a variety of polymers, and specific examples thereof include polyethylene terephthalate, polypropylene, polyethylene, cellulose, and the like. Examples of the inorganic materials include glass, ceramic, and the like.

The constitution and the layer thickness of the solid electrolyte layer in the sheet for an all-solid state secondary battery are the same as the constitution and the layer thickness of the solid electrolyte layer described in the section of the all-solid state secondary battery of the present invention.

This sheet is obtained by forming a film of the solid electrolyte composition for forming the solid electrolyte layer on a base material (possibly, through other layers) (by means of coating and drying) and forming a solid electrolyte layer on the base material. Hereinafter, the solid electrolyte composition for forming the solid electrolyte layer will also be referred to as the "composition for a solid electrolyte layer".

The electrode sheet for an all-solid state secondary battery of the present invention (also simply referred to as "the electrode sheet of the present invention") is an electrode sheet having an active material layer on a collector. This electrode sheet is generally a sheet having a collector and an active material layer, but may be an aspect having a collector, an active material layer, and a solid electrolyte layer in this order or an aspect having a collector, an active material layer, a solid electrolyte layer, and an active material layer in this order.

The constitutions and the layer thicknesses of the respective layers constituting the electrode sheet are the same as the constitutions and the layer thicknesses of the respective layers described in the section of the all-solid state secondary battery of the present invention.

The electrode sheet is obtained by forming a film of the solid electrolyte composition of the present invention which contains an active material on a metal foil (by means of coating and drying) and forming an active material layer on the metal foil.

[Manufacturing of All-Solid State Secondary Battery and Electrode Sheet for All-Solid State Secondary Battery]

The all-solid state secondary battery and the electrode sheet for an all-solid state secondary battery can be manufactured using an ordinary method. Specifically, the all-solid state secondary battery and the electrode sheet for an all-solid state secondary battery can be manufactured by forming the respective layers described above using the solid electrolyte composition of the present invention and the like. The details will be described below.

The all-solid state secondary battery of the present invention can be manufactured using a method including (through) a step of applying the solid electrolyte composition of the present invention onto a metal foil which serves as a collector and forming a coated film (film manufacturing).

For example, a solid electrolyte composition containing a positive electrode active material is applied as a material for a positive electrode (a composition for a positive electrode layer) onto a metal foil which is a positive electrode collector so as to form a positive electrode active material layer, thereby producing a positive electrode sheet for an all-solid state secondary battery. Next, a solid electrolyte composition for forming a solid electrolyte layer is applied onto the positive electrode active material layer so as to form a solid electrolyte layer. Furthermore, a solid electrolyte composition containing a negative electrode active material is applied as a material for a negative electrode (a composition for a negative electrode layer) onto the solid electrolyte layer so as to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can be produced by enclosing the all-solid state secondary battery in a chassis as necessary. Meanwhile, the solid electrolyte composition for forming a solid electrolyte layer is not particularly limited, and an ordinary composition can be used. In addition, the components that the solid electrolyte composition for forming a solid electrolyte layer contains may be the same as the components that the solid electrolyte composition of the present invention contains. However, the solid electrolyte composition for forming a solid electrolyte layer does not contain the active material.

In addition, it is also possible to manufacture an all-solid state secondary battery by carrying out the methods for forming the respective layers in a reverse order so as to form a negative electrode active material layer, a solid electrolyte layer, and a positive electrode active material layer on a negative electrode collector and overlaying a positive electrode collector thereon.

As another method, the following method can be exemplified. That is, a positive electrode sheet for an all-solid state secondary battery is produced as described above. In addition, a solid electrolyte composition containing a negative electrode active material is applied as a material for a negative electrode (a composition for a negative electrode layer) onto a metal foil which is a negative electrode collector so as to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. An all-solid state secondary battery can be manufactured as described above.

As still another method, the following method can be exemplified. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied onto a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated together so as to sandwich the solid electrolyte layer that has been peeled off from the base material. An all-solid state secondary battery can be manufactured as described above.

An all-solid state secondary battery can be manufactured by combining the above-described forming methods. For example, a positive electrode sheet for an all-solid state secondary battery, a negative electrode sheet for an all-solid state secondary battery, and a solid electrolyte sheet for an all-solid state secondary battery are produced respectively. Next, a solid electrolyte layer peeled off from a base material is laminated on the negative electrode sheet for an all-solid state secondary battery and is then attached to the positive electrode sheet for an all-solid state secondary battery, whereby an all-solid state secondary battery can be manufactured. In this method, it is also possible to laminate the solid electrolyte layer on the positive electrode sheet for an all-solid state secondary battery and attach the solid electrolyte layer to the negative electrode sheet for an all-solid state secondary battery.

(Formation of Individual Layers (Film Formation))

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the solid electrolyte composition may be dried after being applied or may be dried after being applied to multiple layers. The drying temperature is not particularly limited. The lower limit is preferably 30° C. or higher, more preferably 60° C. or higher, and still more preferably 80° C. or higher, and the upper limit is preferably 300° C. or lower, more preferably 250° C. or lower, and still more preferably 200° C. or lower. In a case in which the compositions are heated in the above-described temperature range, it is possible to remove the dispersion medium and form a solid state. In addition, the temperature is not excessively increased, and the respective members of the all-solid state secondary battery are not impaired, which is preferable. Therefore, in the all-solid state secondary battery, excellent total performance is exhibited, and it is possible to obtain a favorable bonding property and a favorable ion conductivity even without pressurization.

After the production of the applied solid electrolyte composition or the all-solid state secondary battery, the respective layers or the all-solid state secondary battery is preferably pressurized. In addition, the respective layers are also preferably pressurized in a state of being laminated together. Examples of the pressurization method include a hydraulic cylinder pressing machine and the like. The welding pressure is not particularly limited, but is, generally, preferably in a range of 50 to 1,500 MPa.

In addition, the applied solid electrolyte composition may be heated at the same time as pressurization. The heating temperature is not particularly limited, but is generally in a range of 30° C. to 300° C. The respective layers or the all-solid state secondary battery can also be pressed at a temperature higher than the glass transition temperature of the inorganic solid electrolyte. Meanwhile, in a case in which the inorganic solid electrolyte and the binder particles coexist, the respective layers or the all-solid state secondary battery can also be pressed at a temperature higher than the glass transition temperature of the polymer forming the binder particles. However, generally, the pressing temperature is a temperature that does not exceed the melting point of the polymer.

The pressurization may be carried out in a state in which the applied solvent or dispersion medium has been dried in advance or in a state in which the solvent or the dispersion medium remains.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure can be changed depending on the area or film thickness of the portion under pressure. In addition, it is also possible to apply different pressures to the same portion.

A pressing surface may be flat or roughened.

(Initialization)

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Uses of All-solid State Secondary Battery]

The all-solid state secondary battery of the present invention can be applied to a variety of uses. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer uses include automobiles, electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military uses and universe uses. In addition, the all-solid state secondary battery can also be combined with solar batteries.

Among these, the all-solid state secondary battery is preferably applied to applications for which a high capacity and high-rate discharging characteristics are required. For example, in electricity storage facilities in which an increase in the capacity is expected in the future, it is necessary to satisfy both high safety, which is essential, and furthermore, the battery performance. In addition, in electric vehicles mounting high-capacity secondary batteries and domestic uses in which batteries are charged out every day, better safety is required against overcharging. According to the present invention, it is possible to preferably cope with the above-described use aspects and exhibit excellent effects.

All-solid state secondary batteries refer to secondary batteries having a positive electrode, a negative electrode, and an electrolyte which are all constituted of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (polymer) all-solid state secondary batteries in which a polymer compound such as polyethylene oxide is used as an electrolyte and inorganic all-solid state secondary batteries in which the Li—P—S-based glass ceramic or the like is used. Meanwhile, the application of polymer compounds to inorganic all-solid state secondary batteries is not inhibited, and polymer compounds can also be applied as binders of positive electrode active materials, negative electrode active materials, and inorganic solid electrolytes.

Inorganic solid electrolytes are differentiated from electrolytes in which the above-described polymer compound such as polyethylene oxide is used as an ion conductive medium (polymer electrolyte), and inorganic compounds serve as ion conductive media. Specific examples thereof include the Li—P—S-based glass ceramic. Inorganic solid electrolytes do not emit positive ions (Li ions) and exhibit an ion transportation function. In contrast, there are cases in which materials serving as an ion supply source which is added to electrolytic solutions or solid electrolyte layers and emits positive ions (Li ions) are referred to as electrolytes; however, in the case of being differentiated from electrolytes as the ion transportation materials, the materials are referred to as “electrolyte salts” or “supporting electrolytes”. Examples of the electrolyte salts include lithium bistrifluoromethanesulfonylimide (LiTFSI).

In the case of being referred to as a “composition” in the present invention, the “composition” refers to a mixture obtained by uniformly mixing two or more components. Here, the composition needs to substantially maintain uniformity and may partially include agglomeration or uneven distribution as long as the compositions exhibit desired effects. In addition, particularly, in the case of being referred to as a solid electrolyte composition, the solid electrolyte composition basically refers to a composition (typically having a paste form) which serves as a material for forming the solid electrolyte layer or the like, and an electrolyte layer or the like formed by curing the above-described composition is not considered as the solid electrolyte composition.

EXAMPLES

Hereinafter, the present invention will be described in more detail on the basis of examples. Meanwhile, the present invention is not interpreted to be limited thereto. In the following examples, “parts” and “%” are mass-based unless particularly otherwise described. In addition, the symbol “-” that is used in tables represents the fact that the corresponding component is not contained in the composition of the corresponding example. In addition, in the following description, room temperature refers to 25° C.

Synthesis Example

Synthesis of Sulfide-Based Inorganic Solid Electrolytes

Sulfide-based inorganic solid electrolytes were synthesized with reference to T. Ohtomo, A. Hayashi, M. Tatsumisago, Y. Tsuchida, S. Hama, K. Kawamoto, Journal of Power Sources, 233, (2013), pp. 231 to 235, A. Hayashi, S. Hama, H. Morimoto, M. Tatsumisago, T. Minami, Chem. Lett., (2001), pp. 872 to 873, A. Hayashi, S. Hama, T. Minami, M. Tatsumisago, Electrochemistry Communications, 5, (2003), pp. 111 to 114, S. Boulineau, M. Courty, J.-M. Tarascon, V. Viallet, Solid State Ionics, 221, (2012), pp. 1 to 5, and S. Yubuchi, S. Teragawa, K. Aso, K. Tadanaga, A. Hayashi, M. Tatsumisago, Journal of Power Sources, 293, (2015), pp. 941 to 945.

<$Li_6PS_5Cl$>

In a glove box under an argon atmosphere (dew point: −70° C.), lithium sulfide ($Li_2S$, manufactured by Sigma-Aldrich Co. LLC. Purity: >99.98%) (0.43 g), diphosphorus pentasulfide ($P_2S_5$, manufactured by Sigma-Aldrich Co. LLC. Purity: >99%) (0.41 g), and lithium chloride (LiCl, manufactured by Sigma-Aldrich Co. LLC. Purity: >99%) (0.16 g) were weighed respectively, injected into an agate mortar, and mixed together at room temperature using an agate muddler for five minutes.

Ten zirconia beads having a diameter of 10 mm were injected into a 45 mL zirconia container (manufactured by Fritsch Japan Co., Ltd.), the full amount of a mixture of the lithium sulfide, the diphosphorus pentasulfide, and the lithium chloride was injected thereinto, and the container was sealed under the argon atmosphere. The container was set in a planetary ball mill P-7 (trade name) manufactured by Fritsch Japan Co., Ltd., mechanical milling was carried out at a temperature of 25° C. and a rotation speed of 600 rpm for 10 hours, thereby obtaining a first sulfide-based inorganic solid electrolyte $Li_6PS_5Cl$ including a crystal phase (1.00 g).

<$Li_6PS_5Br$>

In a glove box under an argon atmosphere (dew point: −70° C.), lithium sulfide ($Li_2S$, manufactured by Sigma-Aldrich Co. LLC. Purity: >99.98%) (0.37 g), diphosphorus pentasulfide ($P_2S_5$, manufactured by Sigma-Aldrich Co. LLC. Purity: >99%) (0.35 g), and lithium bromide (LiBr, manufactured by Sigma-Aldrich Co. LLC. Purity: >99%) (0.28 g) were weighed respectively, injected into an agate mortar, and mixed together at room temperature using an agate muddler for five minutes.

Ten zirconia beads having a diameter of 10 mm were injected into a 45 mL zirconia container (manufactured by Fritsch Japan Co., Ltd.), the full amount of a mixture of the lithium sulfide, the diphosphorus pentasulfide, and the lithium bromide was injected thereinto, and the container was sealed under the argon atmosphere. The container was set in a planetary ball mill P-7 (trade name) manufactured by Fritsch Japan Co., Ltd., mechanical milling was carried out at a temperature of 25° C. and a rotation speed of 600 rpm for 10 hours, thereby obtaining a first sulfide-based inorganic solid electrolyte $Li_6PS_5Br$ including a crystal phase (1.00 g).

<$Li_6PS_5I$>

In a glove box under an argon atmosphere (dew point: −70° C.), lithium sulfide ($Li_2S$, manufactured by Sigma-Aldrich Co. LLC. Purity: >99.98%) (0.32 g), diphosphorus pentasulfide ($P_2S_5$, manufactured by Sigma-Aldrich Co.

LLC. Purity: >99%) (0.31 g), and lithium iodide (LiI, manufactured by Sigma-Aldrich Co. LLC. Purity: >99%) (0.37 g) were weighed respectively, injected into an agate mortar, and mixed together at room temperature using an agate muddler for five minutes.

Ten zirconia beads having a diameter of 10 mm were injected into a 45 mL zirconia container (manufactured by Fritsch Japan Co., Ltd.), the full amount of a mixture of the lithium sulfide, the diphosphorus pentasulfide, and the lithium iodide was injected thereinto, and the container was sealed under the argon atmosphere. The container was set in a planetary ball mill P-7 (trade name) manufactured by Fritsch Japan Co., Ltd., mechanical milling was carried out at a temperature of 25° C. and a rotation speed of 600 rpm for 10 hours, thereby obtaining a first sulfide-based inorganic solid electrolyte $Li_6PS_5I$ including a crystal phase (1.00 g).

<$Li_7GeS_5Cl$>

In a glove box under an argon atmosphere (dew point: −70° C.), lithium sulfide ($Li_2S$, manufactured by Sigma-Aldrich Co. LLC. Purity: >99.98%) (0.43 g), germanium sulfide ($GeS_2$, manufactured by Sigma-Aldrich Co. LLC. Purity: >99.99%) (0.43 g), and lithium chloride (LiCl, manufactured by Sigma-Aldrich Co. LLC. Purity: >99%) (0.13 g) were weighed respectively, injected into an agate mortar, and mixed together at room temperature using an agate muddler for five minutes.

Ten zirconia beads having a diameter of 10 mm were injected into a 45 mL zirconia container (manufactured by Fritsch Japan Co., Ltd.), the full amount of a mixture of the lithium sulfide, the germanium sulfide, and the lithium chloride was injected thereinto, and the container was sealed under the argon atmosphere. The container was set in a planetary ball mill P-7 (trade name) manufactured by Fritsch Japan Co., Ltd., mechanical milling was carried out at a temperature of 25° C. and a rotation speed of 600 rpm for 10 hours, thereby obtaining a first sulfide-based inorganic solid electrolyte $Li_7GeS_5Cl$ including a crystal phase (0.99 g).

<$Li_7SiS_5Cl$>

In a glove box under an argon atmosphere (dew point: −70° C.), lithium sulfide ($Li_2S$, manufactured by Sigma-Aldrich Co. LLC. Purity: >99.98%) (0.51 g), silicon sulfide ($SiS_2$, manufactured by Fujifilm Wako Pure Chemical Corporation, Purity: >95%) (0.34 g), and lithium chloride (LiCl, manufactured by Sigma-Aldrich Co. LLC. Purity: >99%) (0.16 g) were weighed respectively, injected into an agate mortar, and mixed together at room temperature using an agate muddler for five minutes.

Ten zirconia beads having a diameter of 10 mm were injected into a 45 mL zirconia container (manufactured by Fritsch Japan Co., Ltd.), the full amount of a mixture of the lithium sulfide, the silicon sulfide, and the lithium chloride was injected thereinto, and the container was sealed under the argon atmosphere. The container was set in a planetary ball mill P-7 (trade name) manufactured by Fritsch Japan Co., Ltd., mechanical milling was carried out at a temperature of 25° C. and a rotation speed of 600 rpm for 10 hours, thereby obtaining a first sulfide-based inorganic solid electrolyte $Li_7SiS_5Cl$ including a crystal phase (1.01 g).

<$Li_7SnS_5Cl$>

In a glove box under an argon atmosphere (dew point: −70° C.), lithium sulfide ($Li_2S$, manufactured by Sigma-Aldrich Co. LLC. Purity: >99.98%) (0.39 g), tin sulfide ($SnS_2$, manufactured by Rare Metallic Co., Ltd., Purity: >99.999%) (0.51 g), and lithium chloride (LiCl, manufactured by Sigma-Aldrich Co. LLC. Purity: >99%) (0.12 g) were weighed respectively, injected into an agate mortar, and mixed together at room temperature using an agate muddler for five minutes.

Ten zirconia beads having a diameter of 10 mm were injected into a 45 mL zirconia container (manufactured by Fritsch Japan Co., Ltd.), the full amount of a mixture of the lithium sulfide, the tin sulfide, and the lithium chloride was injected thereinto, and the container was sealed under the argon atmosphere. The container was set in a planetary ball mill P-7 (trade name) manufactured by Fritsch Japan Co., Ltd., mechanical milling was carried out at a temperature of 25° C. and a rotation speed of 600 rpm for 10 hours, thereby obtaining a first sulfide-based inorganic solid electrolyte $Li_7SnS_5Cl$ including a crystal phase (1.02 g).

<Li—P—S-Based Glass>

In a glove box under an argon atmosphere (dew point: −70° C.), lithium sulfide ($Li_2S$, manufactured by Sigma-Aldrich Co. LLC. Purity: >99.98%) (2.42 g) and diphosphorus pentasulfide ($P_2S_5$, manufactured by Sigma-Aldrich Co. LLC. Purity: >99%) (3.90 g) were weighed respectively, injected into an agate mortar, and mixed together at room temperature using an agate muddler for five minutes. Meanwhile, the molar ratio between $Li_2S$ and $P_2S_5$ was set to 75:25 ($Li_2S$:$P_2S_5$).

Sixty six zirconia beads having a diameter of 5 mm were injected into a 45 mL zirconia container (manufactured by Fritsch Japan Co., Ltd.), the full amount of a mixture of the lithium sulfide and the diphosphorus pentasulfide was injected thereinto, and the container was sealed under the argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, thereby obtaining a second sulfide-based inorganic solid electrolyte (Li—P—S-based glass) including no crystal phases (6.20 g).

<Li—P—S-Based Glass Ceramic>

In a glove box under an argon atmosphere (dew point: −70° C.), lithium sulfide ($Li_2S$, manufactured by Sigma-Aldrich Co. LLC. Purity: >99.98%) (3.7 g) and diphosphorus pentasulfide ($P_2S_5$, manufactured by Sigma-Aldrich Co. LLC. Purity: >99%) (4.4 g) were weighed respectively, injected into an agate mortar, and mixed together at room temperature using an agate muddler for five minutes. Meanwhile, the molar ratio between $Li_2S$ and $P_2S_5$ was set to 80:20 ($Li_2S$:$P_2S_5$).

Sixty six zirconia beads having a diameter of 5 mm were injected into a 45 mL zirconia container (manufactured by Fritsch Japan Co., Ltd.), the full amount of a mixture of the lithium sulfide and the diphosphorus pentasulfide was injected thereinto, and the container was sealed under the argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours. The obtained powder was heated under an argon atmosphere at 300° C. for five hours, thereby obtaining a first sulfide-based inorganic solid electrolyte Li—P—S-based glass ceramic including a crystal phase (8.1 g).

Example 1

<Coating of Active Material with First Sulfide-Based Inorganic Solid Electrolyte>

$Li_6PS_5Cl$ (the first sulfide-based inorganic solid electrolyte) (0.2 g) was dissolved in ethanol (1.8 g) at room temperature, thereby obtaining an ethanol solution in which $Li_6PS_5Cl$ was dissolved. Lithium nickel manganese cobalt oxide ($LiNi_{0.33}Co_{0.33}Mn_{0.33}O_2$, NMC) (1.93 g) was added to the solution (0.4 g) as a positive electrode active material, and the components were stirred at room temperature for 10 minutes and dried at 180° C. for three hours, thereby obtaining an active material coated with the first sulfide-based inorganic solid electrolyte.

Meanwhile, the specimen was observed using a transmission electron microscope (TEM), and the elements constituting the active material and the first inorganic solid electrolyte were analyzed by means of energy-dispersive X-ray spectroscopy (EDX), thereby confirming that the active material and the first inorganic solid electrolyte were in contact with each other.

<Preparation of Composition for Solid Electrolyte Layer>

One hundred eighty zirconia beads having a diameter of 5 mm were injected into a 45 mL zirconia container (manufactured by Fritsch Japan Co., Ltd.), and Li—P—S-based glass synthesized above (9.8 g), trade name FLOW BEADS LE-1080 manufactured by Sumitomo Seika Chemicals Co., Ltd. (a binder having a particle shape) (0.2 g) as a binder, and isobutyronitrile (15.0 g) as a dispersion medium were injected thereinto. After that, the container was set in a planetary ball mill P-7 manufactured by Fritsch Japan Co., Ltd., the components were continuously stirred at a temperature of 25° C. and a rotation speed of 300 rpm for two hours, thereby preparing a composition for a solid electrolyte layer.

<Preparation of Composition for Positive Electrode Layer>

A composition for a positive electrode layer for producing a positive electrode sheet for an all-solid state secondary battery was prepared according to a composition shown in Table 1.

One hundred eighty zirconia beads having a diameter of 5 mm were injected into a 45 mL zirconia container (manufactured by Fritsch Japan Co., Ltd.), and Li—P—S-based glass synthesized above (the second sulfide-based inorganic solid electrolyte) (2 g), trade name FLOW BEADS LE-1080 manufactured by Sumitomo Seika Chemicals Co., Ltd. as a binder, and isobutyronitrile (12.3 g) as a dispersion medium were injected thereinto. The container was set in a planetary ball mill P-7 manufactured by Fritsch Japan Co., Ltd., and the components were continuously mixed at a temperature of 25° C. and a rotation speed of 300 rpm for two hours. After that, an active material coated with the first sulfide-based inorganic solid electrolyte was injected into the container, similarly, the container was set in the planetary ball mill P-7, and the components were continuously mixed together at a temperature of 25° C. and a rotation speed of 200 rpm for 15 minutes, thereby preparing a composition for a positive electrode layer. Meanwhile, the ratio between the active material coated with the first sulfide-based inorganic solid electrolyte, the binder, and the second sulfide-based inorganic solid electrolyte was adjusted to reach the value (% by mass) shown in Table 1.

<Preparation of Composition for Negative Electrode Layer>

A composition for a negative electrode layer for producing a negative electrode sheet for an all-solid state secondary battery was prepared according to a composition shown in Table 1.

One hundred eighty zirconia beads having a diameter of 5 mm were injected into a 45 mL zirconia container (manufactured by Fritsch Japan Co., Ltd.), and Li—P—S-based glass synthesized above (4 g), trade name FLOW BEADS LE-1080 manufactured by Sumitomo Seika Chemicals Co., Ltd. as a binder, and isobutyronitrile (12.3 g) as a dispersion medium were injected thereinto. The container was set in a planetary ball mill P-7 manufactured by Fritsch Japan Co., Ltd., and the components were continuously mixed at a temperature of 25° C. and a rotation speed of 300 rpm for two hours. After that, graphite (average particle diameter: 20 μm, manufactured by Nippon Kokuen Group) was injected as an active material into the container, similarly, the container was set in the planetary ball mill P-7, and the components were continuously mixed together at a temperature of 25° C. and a rotation speed of 100 rpm for 10 minutes, thereby preparing a composition for a negative electrode layer. Meanwhile, the ratio between the negative electrode active material, the binder, and the sulfide-based inorganic solid electrolyte was adjusted to reach the value (% by mass) shown in Table 1.

<Production of Positive Electrode Sheet for All-Solid State Secondary Battery>

The composition for a positive electrode layer prepared above was applied onto a 20 μm-thick aluminum foil using an applicator (trade name: SA-201 Baker-type applicator, manufactured by Tester Sangyo Co., Ltd.), heated at 80° C. for one hour, and, furthermore, dried at 110° C. for one hour. After that, the dried composition was heated (at 120° C.) and pressurized (at a pressure of 600 MPa for one minute) using a heat pressing machine, thereby producing a positive electrode sheet for an all-solid state secondary battery having a laminate structure of the positive electrode active material layer and the aluminum foil.

<Production of Negative Electrode Sheet for All-Solid State Secondary Battery>

The composition for a negative electrode layer prepared above was applied onto a 20 μm-thick copper foil using an applicator (trade name: SA-201 Baker-type applicator, manufactured by Tester Sangyo Co., Ltd.), heated at 80° C. for one hour, and, furthermore, dried at 110° C. for one hour. After that, the dried composition was heated (at 120° C.) and pressurized (at a pressure of 600 MPa for one minute) using a heat pressing machine, thereby producing a negative electrode sheet for an all-solid state secondary battery having a laminate structure of the negative electrode active material layer and the copper foil.

The composition for a solid electrolyte layer prepared above was applied onto the negative electrode active material layer produced above using an applicator, heated at 80° C. for one hour, and, furthermore, heated at 110° C. for six hours. A sheet having a solid electrolyte layer formed on the negative electrode active material layer was heated (at 120° C.) and pressurized (at a pressure of 600 MPa for one minute) using a heat pressing machine, thereby producing a negative electrode sheet for an all-solid state secondary battery having a laminate structure of the solid electrolyte layer, the negative electrode active material layer, and the copper foil.

—Manufacturing of All-Solid State Secondary Battery—

Figure 2:
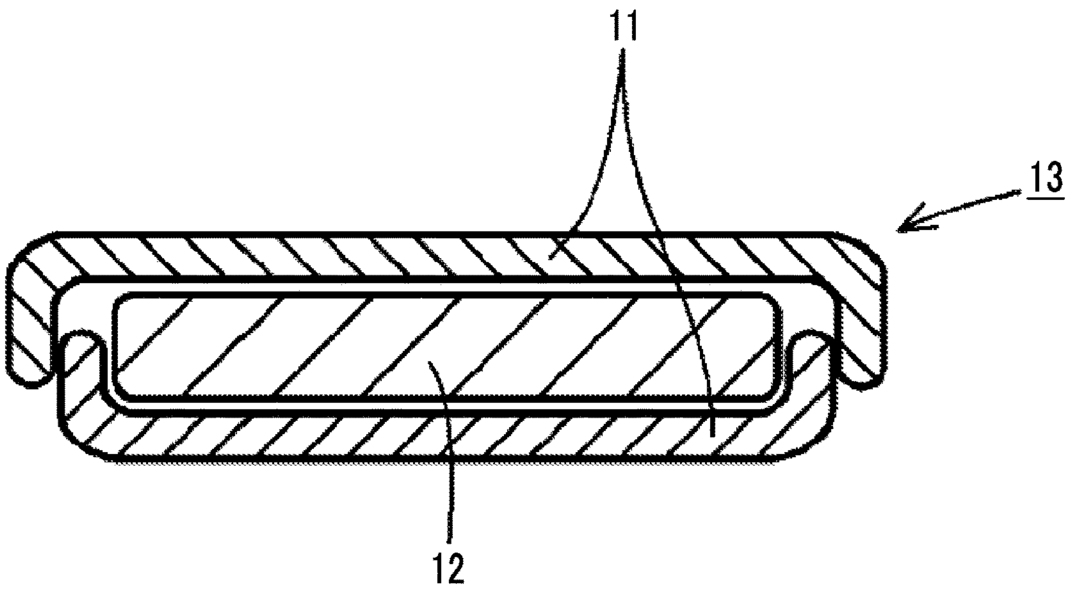
FIG. 2 is a vertical cross-sectional view schematically illustrating an all-solid state secondary battery (coin battery) produced in an example.

A disc-shaped piece having a diameter of 14.5 mm was cut out from the negative electrode sheet for an all-solid state secondary battery manufactured above and put into a 2032-type stainless steel coin case 11 into which a spacer and a washer were combined so that disc-shaped pieces having a diameter of 13.0 mm cut out from the positive electrode active material layer and the solid electrolyte layer in the positive electrode sheet for an all-solid state secondary battery faced each other. A coin battery 13 of Example 1 shown in Table 1 which had a constitution of FIG. 2 was manufactured in the above-described manner.

An all-solid state secondary battery sheet in a 2032-type coin case has the constitution of FIG. 1 and has a laminate structure of a negative electrode sheet for an all-solid state secondary battery (a copper foil/a negative electrode active material layer)/a solid electrolyte layer/a positive electrode sheet for an all-solid state secondary battery (a positive electrode active material layer/an aluminum foil). The layer thicknesses of the positive electrode active material layer, the negative electrode active material layer, and the solid electrolyte layer were 45 μm, 30 μm, and 40 μm respectively in this order.

Examples 2 to 12 and Comparative Examples 1 to 5

All-solid state secondary batteries of Examples 2 to 12 and Comparative Examples 1 to 5 were manufactured respectively in the same manner as the coin battery of Example 1 except for the fact that the composition was adjusted as shown in Table 1. The ratios among the active materials, the first sulfide-based inorganic solid electrolyte, the second sulfide-based inorganic solid electrolyte, and the binder were adjusted so as to reach the value (% by mass) shown in Table 1.

Meanwhile, the compositions for a positive electrode layer or a negative electrode layer that were used in the examples and the comparative examples for which a second electrolyte is shown in Table 1 below were prepared using the active material coated with the first sulfide-based inorganic solid electrolyte in the same manner as the composition for a positive electrode layer of Example 1.

On the other hand, the compositions for a positive electrode layer or a negative electrode layer that were used in the examples and the comparative examples for which a second electrolyte is not shown in Table 1 below were prepared in the same manner as the composition for a negative electrode layer of Example 1 without coating the active material with the first sulfide-based inorganic solid electrolyte.

In addition, the first electrolyte for the positive electrode sheet for an all-solid state secondary battery of Comparative Example 3 in Table 1 is decomposed in the case of being dissolved in ethanol. Therefore, an active material coated with the first electrolyte was obtained using the following method.

Sixty six zirconia beads having a diameter of 5 mm were injected into a 45 mL zirconia container (manufactured by Fritsch Japan Co., Ltd.), lithium nickel manganese cobalt oxide ($LiNi_{0.33}Co_{0.33}Mn_{0.33}O_2$, NMC) (4.83 g) as a positive electrode active material and the Li—P—S-based glass ceramic (the first sulfide-based inorganic solid electrolyte) (0.1 g) were injected thereinto, and the container was sealed under the argon atmosphere. The container was set in a planetary ball mill P-7 (trade name) manufactured by Fritsch Japan Co., Ltd., and mechanical milling was carried out at a temperature of 25° C. and a rotation speed of 100 rpm for 30 minutes. The obtained powder was heated under an argon atmosphere at 180° C. for three hours.

The cycle characteristics of the all-solid state secondary batteries of Examples 1 to 12 and Comparative Examples 1 to 5 manufactured above were evaluated. The results are shown in Table 1 below.

<Evaluation of Cycle Characteristics (Measurement of Discharge Capacity Retention)>

The coin batteries manufactured above were measured using a charge and discharge evaluation device TOSCAT-3000 (trade name) manufactured by Toyo System Corporation.

The batteries were charged at a current value of 0.2 mA until the battery voltage reached 4.2 V and then discharged at a current value of 0.2 mA until the battery voltage reached 3.0 V, which was considered as one cycle. The discharge capacity retention (%) was obtained from the following expression.

Discharge capacity at $100^{th}$ cycle [mAh]/discharge capacity at first cycle [mAh]×100

TABLE 1

| | Positive electrode sheet for all-solid state secondary battery | | | | | | | | | Negative electrode sheet for all-solid state secondary battery |
|---|---|---|---|---|---|---|---|---|---|---|
| | Positive electrode active material | | First electrolyte | | | Second electrolyte | | Binder | | Negative electrode active material |
| | Kind | % by mass | Kind | Crystal phase | % by mass | Kind | % by mass | Kind | % by mass | Kind |
| Ex 1 | NMC | 77.2 | $Li_6PS_5Cl$ | Included | 1.6 | Glass | 19.3 | LE-1081 | 1.9 | Graphite |
| Ex 2 | NMC | 77.2 | $Li_6PS_5Br$ | Included | 1.6 | Glass | 19.3 | LE-1081 | 1.9 | Graphite |
| Ex 3 | NMC | 77.2 | $Li_6PS_5I$ | Included | 1.6 | Glass | 19.3 | LE-1081 | 1.9 | Graphite |
| Ex 4 | NMC | 77.2 | $Li_7GeS_5Cl$ | Included | 1.6 | Glass | 19.3 | LE-1081 | 1.9 | Graphite |
| Ex 5 | NMC | 77.2 | $Li_7SiS_5Cl$ | Included | 1.6 | Glass | 19.3 | LE-1081 | 1.9 | Graphite |
| Ex 6 | NMC | 77.2 | $Li_7SnS_5Cl$ | Included | 1.6 | Glass | 19.3 | LE-1081 | 1.9 | Graphite |
| Ex 7 | NMC | 77.2 | $Li_6PS_5Cl$ | Included | 1.6 | Glass | 19.3 | LE-1081 | 1.9 | Graphite |
| Ex 8 | NMC | 77.2 | $Li_6PS_5Cl$ | Included | 1.6 | Glass | 19.3 | LE-1081 | 1.9 | Graphite |
| Ex 9 | NMC | 77.2 | $Li_6PS_5Cl$ | Included | 1.6 | Glass | 19.3 | LE-1081 | 1.9 | Graphite |
| Ex 10 | NMC | 78.7 | $Li_6PS_5Cl$ | Included | 1.6 | Glass | 19.7 | — | — | Graphite |
| Ex 11 | NMC | 78.4 | $Li_6PS_5Cl$ | Included | 0.1 | Glass | 19.5 | LE-1081 | 2 | Graphite |
| Ex 12 | NMC | 77.2 | $Li_6PS_5Cl$ | Included | 1.6 | Glass | 19.3 | Latex-based | 1.9 | Graphite |
| Com 1 | NMC | 78.4 | Ceramic | Included | 19.6 | — | — | LE-1081 | 2 | Graphite |
| Com 2 | NMC | 78.4 | Glass | Not included | 19.6 | — | — | LE-1081 | 2 | Graphite |
| Com 3 | NMC | 77.2 | Ceramic | Included | 1.6 | Glass | 19.3 | LE-1081 | 1.9 | Graphite |
| Com 4 | NMC | 78.4 | $Li_6PS_5Cl$ | Included | 19.6 | — | — | LE-1081 | 2 | Graphite |
| Com 5 | NMC | 78.4 | Glass | Not included | 19.6 | — | — | — | — | Graphite |

| Negative electrode sheet for all-solid state secondary battery | | | | |
|---|---|---|---|---|
| Negative electrode active material | First electrolyte | Second electrolyte | Binder | Discharge |

TABLE 1-continued

| | % by mass | Kind | Crystal phase | % by mass | Kind | % by mass | Kind | % by mass | capacity retention |
|---|---|---|---|---|---|---|---|---|---|
| Ex 1 | 58.8 | Glass | Not included | 39.2 | — | — | LE-1081 | 2 | 92.6% |
| Ex 2 | 58.8 | Glass | Not included | 39.2 | — | — | LE-1081 | 2 | 92.5% |
| Ex 3 | 58.8 | Glass | Not included | 39.2 | — | — | LE-1081 | 2 | 91.8% |
| Ex 4 | 58.8 | Glass | Not included | 39.2 | — | — | LE-1081 | 2 | 91.9% |
| Ex 5 | 58.8 | Glass | Not included | 39.2 | — | — | LE-1081 | 2 | 91.8% |
| Ex 6 | 58.8 | Glass | Not included | 39.2 | — | — | LE-1081 | 2 | 91.9% |
| Ex 7 | 58.1 | $Li_6PS_5Cl$ | Included | 1.2 | Glass | 38.8 | LE-1081 | 1.9 | 95.4% |
| Ex 8 | 58.1 | $Li_6PS_5Br$ | Included | 1.2 | Glass | 38.8 | LE-1081 | 1.9 | 95.0% |
| Ex 9 | 58.1 | $Li_6PS_5I$ | Included | 1.2 | Glass | 38.8 | LE-1081 | 1.9 | 94.6% |
| Ex 10 | 58.1 | $Li_6PS_5Cl$ | Included | 1.2 | Glass | 38.8 | — | — | 90.7% |
| Ex 11 | 58.1 | $Li_6PS_5Cl$ | Included | 1.2 | Glass | 38.8 | LE-1081 | 1.9 | 91.3% |
| Ex 12 | 58.1 | $Li_6PS_5Cl$ | Included | 1.2 | Glass | 38.8 | LE-1081 | 1.9 | 97.6% |
| Com 1 | 58.8 | Glass | Not included | 39.2 | — | — | LE-1081 | 2 | 77.7% |
| Com 2 | 58.8 | Glass | Not included | 39.2 | — | — | LE-1081 | 2 | 77.5% |
| Com 3 | 58.8 | Glass | Not included | 39.2 | — | — | LE-1081 | 2 | 80.3% |
| Com 4 | 58.8 | Glass | Not included | 39.2 | — | — | LE-1081 | 2 | 85.6% |
| Com 5 | 58.8 | Glass | Not included | 39.2 | — | — | — | — | 73.1% |

<Note of Table>

Ex: Example

Corn: Comparative Example

First electrolyte: First sulfide-based inorganic solid electrolyte

Second electrolyte: Second sulfide-based inorganic solid electrolyte

Latex-based: B-1 described in [0127] of JP2015-88486A

Ceramic: Li—P—S-based glass ceramic synthesized above

Glass: Li—P—S-based glass synthesized above

Meanwhile, for Comparative Examples 1 to 5, glass ceramic and glass are described in the column of the first electrolyte in order for the comparison with the examples.

As is clear from Table 1, it is found that the all-solid state secondary batteries of Examples 1 to 12 which satisfied the regulations of the present invention had excellent cycle characteristics.

The present invention has been described together with the embodiment; however, unless particularly designated, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
11: 2032-type coin case
12: all-solid state secondary battery sheet
13: cell for measuring cycle characteristics (coin battery)

What is claimed is:

1. A solid electrolyte composition comprising:

an active material;

a first sulfide-based inorganic solid electrolyte; and a second sulfide-based inorganic solid electrolyte having a composition different from that of the first sulfide-based inorganic solid electrolyte, wherein the active material is a positive electrode active material or a negative electrode active material, wherein the positive electrode active material contains a transition metal oxide, wherein the negative electrode active material contains at least one of a carbonaceous material, a metal oxide, a metal complex oxide, lithium, a lithium alloy, a metal capable of forming an alloy with lithium, wherein the first sulfide-based inorganic solid electrolyte is a sulfide-based inorganic solid electrolyte represented by Formula (1), $$L_aMY_bX_c \qquad \text{Formula(1)}$$

in Formula (1), L represents at least one element selected from the group consisting of Li, Na, and K, M represents at least one element selected from the group consisting of Al, Ga, In, Si, Ge, Sn, P, As, Ti, Zr, V, Nb, and Ta, Y represents at least one element selected from the group consisting of O, S, and Se; here, the sulfide-based inorganic solid electrolyte represented by Formula (1) includes at least S represented by Y, X represents at least one element selected from the group consisting of Cl, Br, and I, $2 \leq a < 12$, $2 \leq b \leq 8$, and $0 < c \leq 5$, wherein the first sulfide-based inorganic solid electrolyte has a crystal phase at least in part, and wherein the first sulfide-based inorganic solid electrolyte coats the active material.

2. The solid electrolyte composition according to claim 1, wherein the first sulfide-based inorganic solid electrolyte is represented by Formula (2), $$Li_{7-x}PS_{6-x}X_x \qquad \text{Formula(2)}$$

in Formula (2), X is at least one element selected from the group consisting of Cl, Br, and I, and $0 < x \leq 2$.

3. The solid electrolyte composition according to claim 1, wherein X includes at least one element selected from the group consisting of Cl and Br.

4. The solid electrolyte composition according to claim 1, further comprising:

a binder.

5. The solid electrolyte composition according to claim 4, wherein the binder has a particle shape.

6. The solid electrolyte composition according to claim 4, wherein the binder is an acrylic latex, a urethane latex, and/or a urea latex.

7. An electrode sheet for an all-solid state secondary battery comprising:

a layer of the solid electrolyte composition according to claim 1 on a collector.

8. An all-solid state secondary battery comprising:

a positive electrode active material layer;

a negative electrode active material layer; and an inorganic solid electrolyte layer, wherein at least one layer of the positive electrode active material layer and the negative electrode active material layer is a layer of the solid electrolyte composition according to claim 1.

9. A method for manufacturing an electrode sheet for an all-solid state secondary battery, comprising the following steps of:

[1] a step of coating an active material with a first sulfide-based inorganic solid electrolyte; and

[2] a step of mixing a second sulfide-based inorganic solid electrolyte and the active material coated with the first sulfide-based inorganic solid electrolyte, wherein the active material is a positive electrode active material or a negative electrode active material, wherein the positive electrode active material contains a transition metal oxide, wherein the negative electrode active material contains at least one of a carbonaceous material, a metal oxide, a metal complex oxide, lithium, a lithium alloy, a metal capable of forming an alloy with lithium, wherein the first sulfide-based inorganic solid electrolyte is a first sulfide-based inorganic solid electrolyte represented by Formula (1), $$L_aMY_bX_c \qquad \text{Formula(1)}$$

in Formula (1), L represents at least one element selected from the group consisting of Li, Na, and K, M represents at least one element selected from the group consisting of Al, Ga, In, Si, Ge, Sn, P, As, Ti, Zr, V, Nb, and Ta, Y represents at least one element selected from the group consisting of O, S, and Se; here, the sulfide-based inorganic solid electrolyte represented by Formula (1) includes at least S represented by Y, X represents at least one element selected from the group consisting of Cl, Br, and I, $2 \leq a < 12$, $2 \leq b \leq 8$, and $0 < c \leq 5$, wherein the first sulfide-based inorganic solid electrolyte has a crystal phase at least in part, and the second sulfide-based inorganic solid electrolyte has a composition different from that of the first sulfide-based inorganic solid electrolyte.

10. A method for manufacturing an all-solid state secondary battery, comprising:

manufacturing an all-solid state secondary battery using the method for manufacturing an electrode sheet for an all-solid state secondary battery according to claim 9.

11. The solid electrolyte composition according to claim 1, wherein the second sulfide-based inorganic solid electrolyte is a glass containing Li, P, and S or a glass ceramic containing Li, P and S.

12. The method for manufacturing an electrode sheet for an all-solid state secondary battery according to claim 9, wherein the second sulfide-based inorganic solid electrolyte is a glass containing Li, P, and S or a glass ceramic containing Li, P and S.

* * * * *